United States Patent
Kim et al.

(10) Patent No.: US 12,004,215 B2
(45) Date of Patent: Jun. 4, 2024

(54) METHOD FOR TRANSMITTING AND RECEIVING SIGNAL IN WIRELESS COMMUNICATION SYSTEM SUPPORTING UNLICENSED BAND, AND DEVICES SUPPORTING SAME

(71) Applicant: LG ELECTRONICS INC., Seoul (KR)

(72) Inventors: Seonwook Kim, Seoul (KR); Joonkui Ahn, Seoul (KR); Yunjung Yi, Seoul (KR); Hanjun Park, Seoul (KR); Kijun Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/717,574

(22) Filed: Apr. 11, 2022

(65) Prior Publication Data
US 2022/0240319 A1    Jul. 28, 2022

Related U.S. Application Data

(63) Continuation of application No. 16/323,398, filed as application No. PCT/KR2017/008323 on Aug. 2, 2017, now Pat. No. 11,317,440.
(Continued)

(51) Int. Cl.
*H04W 72/04* (2023.01)
*H04W 8/00* (2009.01)
(Continued)

(52) U.S. Cl.
CPC ....... *H04W 74/0816* (2013.01); *H04W 8/005* (2013.01); *H04W 16/28* (2013.01); *H04W 24/10* (2013.01)

(58) Field of Classification Search
CPC . H04W 74/0816; H04W 8/005; H04W 16/28; H04W 24/10; H04W 74/0808;
(Continued)

(56) References Cited

U.S. PATENT DOCUMENTS

| | | |
|---|---|---|
| 2015/0311971 A1 | 10/2015 | Learned et al. |
| 2016/0037560 A1 | 2/2016 | Liu et al. |

(Continued)

FOREIGN PATENT DOCUMENTS

| | | | |
|---|---|---|---|
| CN | 105684323 | | 6/2016 |
| CN | 106162907 | A * | 11/2016 |

(Continued)

OTHER PUBLICATIONS

International Search Report and Written Opinion in International Appln. No. PCT/KR2017/008323, dated Oct. 25, 2017, 20 pages (with English translation).

(Continued)

*Primary Examiner* — Maharishi V Khirodhar
(74) *Attorney, Agent, or Firm* — Fish & Richardson P.C.

(57) ABSTRACT

A method for transmitting and receiving a signal between a terminal and a base station in a wireless communication system supporting an unlicensed band, and devices supporting same. More particularly, a method for transmitting a PUSCH based on combination of the information about the interlaces and the one or more RB sets included in the DCI, and devices supporting same.

12 Claims, 18 Drawing Sheets

Related U.S. Application Data

(60) Provisional application No. 62/371,851, filed on Aug. 8, 2016, provisional application No. 62/371,238, filed on Aug. 5, 2016.

(51) Int. Cl.
  *H04W 16/28* (2009.01)
  *H04W 24/10* (2009.01)
  *H04W 74/0816* (2024.01)
  *H04W 76/00* (2018.01)
  *H04W 88/08* (2009.01)

(58) Field of Classification Search
  CPC .......... H04W 74/0833; H04W 74/0866; H04B 7/0695; H04B 7/0617
  USPC .......................................................... 370/329
  See application file for complete search history.

(56) References Cited

U.S. PATENT DOCUMENTS

| | | |
|---|---|---|
| 2016/0050667 A1 | 2/2016 | Papasakellariou et al. |
| 2016/0127098 A1 | 5/2016 | Ng et al. |
| 2017/0094680 A1* | 3/2017 | Patel ..................... H04W 72/23 |
| 2017/0331577 A1 | 11/2017 | Parkvall et al. |
| 2018/0302926 A1 | 10/2018 | Bhorkar et al. |

FOREIGN PATENT DOCUMENTS

| | | | | |
|---|---|---|---|---|
| JP | 2019125819 A | * | 7/2019 | ............ H04W 72/04 |
| KR | 20160037766 | | 4/2016 | |

OTHER PUBLICATIONS

NTT Docomo, "Making 5G a Reality," NTT Docomo Technical Journal, Apr. 2016, vol. 17 No. 4, pp. 1-90.
Office Action in Chinese Appln. No. 201780048786.6, dated Feb. 8, 2022, 16 pages (with English translation).

* cited by examiner

PRIOR ART

PRIOR ART

PRIOR ART

PRIOR ART

FIG. 21A
FIG. 21B
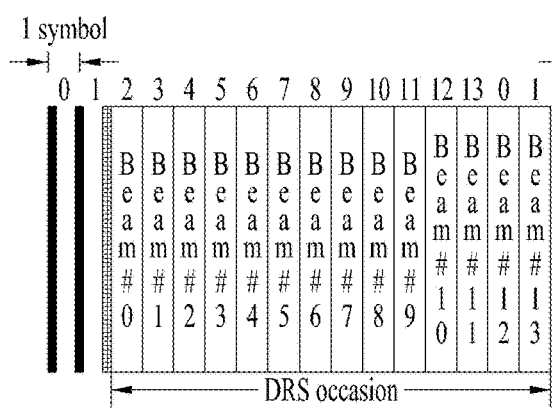
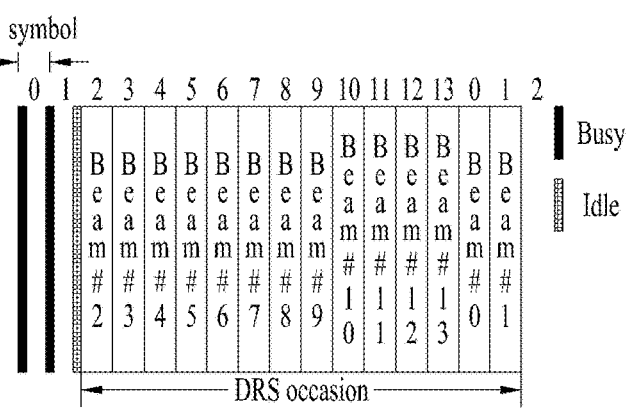

METHOD FOR TRANSMITTING AND RECEIVING SIGNAL IN WIRELESS COMMUNICATION SYSTEM SUPPORTING UNLICENSED BAND, AND DEVICES SUPPORTING SAME

CROSS-REFERENCE TO RELATED APPLICATIONS

This application is a continuation of U.S. application Ser. No. 16/323,398, filed on Feb. 5, 2019, which is a National Stage application under 35 U.S.C. § 371 of International Application No. PCT/KR2017/008323, filed on Aug. 2, 2017, which claims the benefit of U.S. Provisional Application No. 62/371,851, filed on Aug. 8, 2016, and U.S. Provisional Application No. 62/371,238, filed on Aug. 5, 2016. The disclosures of the prior applications are incorporated by reference in their entirety.

TECHNICAL FIELD

The present disclosure relates to a wireless communication system, and more particularly, to a method for transmitting and receiving signals between a terminal and a base station in a wireless communication system supporting an unlicensed band and device for supporting the same.

Specifically, the present disclosure is directed to a method for transmitting a signal by applying a different/independent analog beam to each symbol based on a location where a channel access procedure for signal transmission in an unlicensed band (e.g., Listen Before Talk (LBT)) is successfully performed and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY

The object of the present invention is to provide a method for transmitting and receiving signals between a terminal and a base station when a newly proposed wireless communication system supports unlicensed bands and device therefor.

More particularly, the object of the present invention is to provide a signal transmission and reception method considering the characteristics of an unlicensed band where signal transmission and reception is performed in a contention-based manner and the characteristics of a new wireless communication system where an independent analog beam can be applied to each symbol and device therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention proposes a method of transmitting a signal to a second communication node by a first communication node in a wireless communication system supporting an unlicensed band and device therefor.

In an aspect of the present invention, provided is a method of transmitting a signal to a second communication node by a first communication node in a wireless communication system supporting unlicensed band. The method may include: performing a channel access procedure for signal transmission in the unlicensed band; and transmitting the signal to the second communication node in the unlicensed band by applying an independent analog beam to each symbol during a predetermined number of symbol periods from a symbol where the channel access procedure succeeds.

In another aspect of the present invention, provided is a communication node for transmitting a signal to a different communication node in a wireless communication system supporting an unlicensed band. The communication node may include: a transmitter; and a processor connected to the transmitter, the processor configured to: perform a channel access procedure for signal transmission in the unlicensed band; and transmit the signal to the different communication node in the unlicensed band by applying an independent analog beam to each symbol during a predetermined number of symbol periods from a symbol where the channel access procedure succeeds. Hereinafter, the communication node is referred to as the first communication node, and the different communication node is referred to as the second communication node for convenience of description.

In the present invention, the channel access procedure may include Listen Before Talk (LBT) for checking whether another signal is transmitted in the unlicensed band through channel sensing on the unlicensed band.

In addition, the analog beams applied to the individual symbols during the predetermined number of symbol periods from the symbol where the channel access procedure succeeds may be analog beams determined sequentially from the first analog beam index in analog beam index order decided in advance to be applied when the first communication node transmits the signal.

Alternatively, the analog beams applied to the individual symbols during the predetermined number of symbol periods from the symbol where the channel access procedure succeeds may be analog beams determined sequentially and rotationally from an analog beam index corresponding to the symbol where the channel access procedure succeeds in analog beam index order decided in advance to be applied when the first communication node transmits the signal.

In this case, the predetermined number of symbol periods may be equal to or smaller than a symbol region required for the signal transmission.

If the symbol region required for the signal transmission is greater than a symbol length from the symbol where the channel access procedure succeeds until a time period allocated to the first communication node for the signal transmission, the predetermined number of symbol periods may be equal to the symbol length from the symbol where the channel access procedure succeeds until the time period allocated to the first communication node for the signal transmission.

Alternatively, if the symbol region required for the signal transmission is smaller than the symbol length from the symbol where the channel access procedure succeeds until the time period allocated to the first communication node for the signal transmission, the predetermined number of symbol periods may be equal to a symbol length of the symbol region required for the signal transmission.

In the present invention, the first communication node may be a New RAT (NR) base station or a terminal. In addition, the second communication node may be a terminal or an NR base station.

Moreover, the signal may include a synchronization signal and either a signal used for Radio Resource Management (RRM) measurement or a random access preamble.

In particular, when the signal includes the synchronization signal and the signal for the RRM measurement, the first communication node may transmit information on the symbol where the channel access procedure succeeds to the second communication node.

It is to be understood that both the foregoing general description and the following detailed description of the present disclosure are exemplary and explanatory and are intended to provide further explanation of the disclosure as claimed.

As is apparent from the above description, the embodiments of the present invention have the following effects.

According to the present invention, a terminal or a base station can transmit a signal by applying an independent analog beam to each symbol during a predetermined number of symbol periods after succeeding in a channel access procedure for an unlicensed band.

In addition, such a signal transmission method can be applied when an NR base station transmits a Discovery Reference Signal (DRS) or when a UE transmits a random access preamble.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIGS. 21A and 20B illustrate an NR-DRS transmission method according to another embodiment of the present invention;

DETAILED DESCRIPTION

Figure 1:
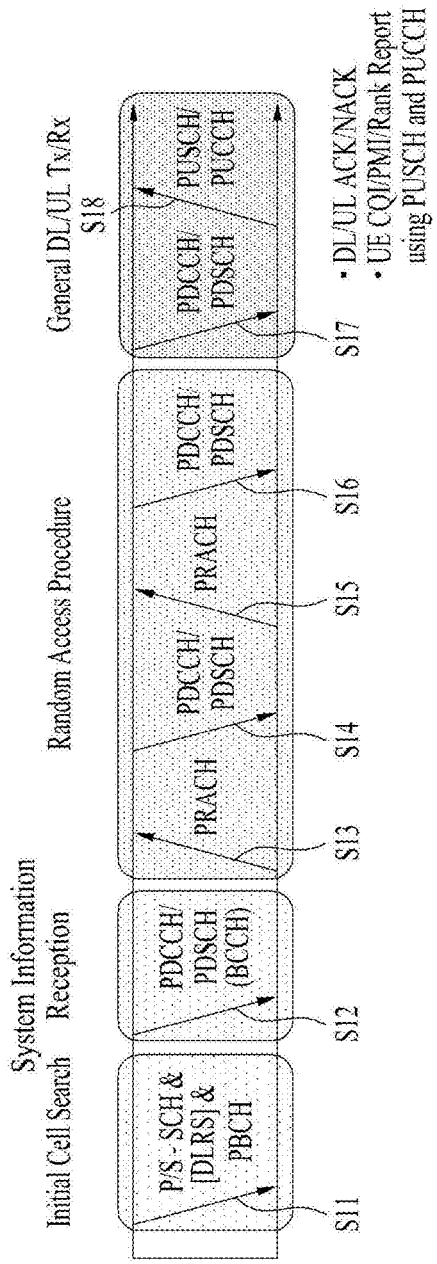
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2A:
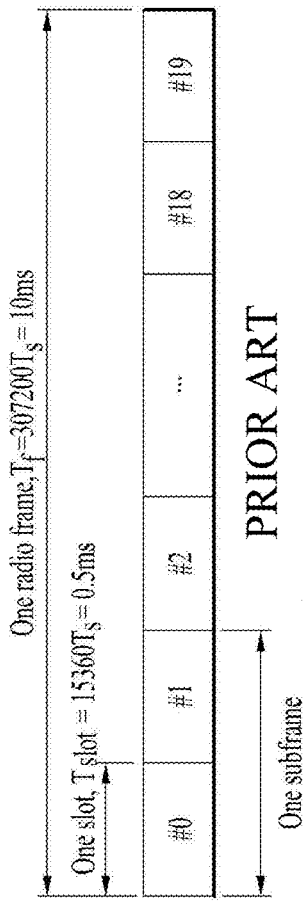
FIGS. 2A and 2B are diagrams illustrating exemplary radio frame structures.
Figure 2B:
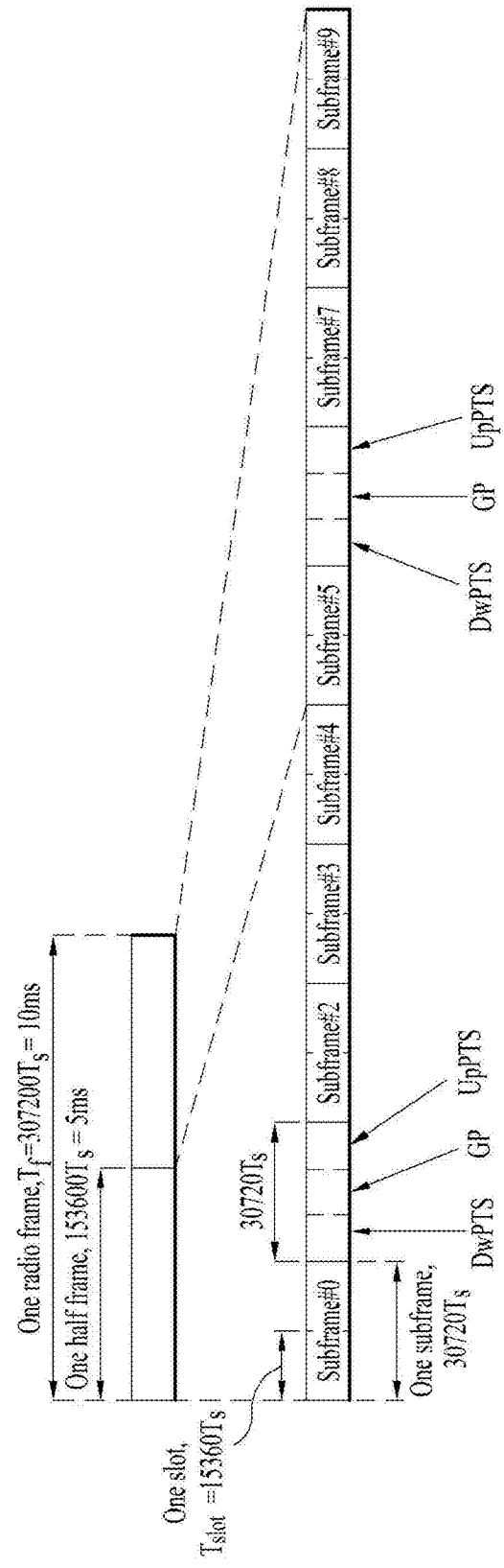

FIGS. 2A and 2B illustrate exemplary radio frame structures used in embodiments of the present disclosure.

FIG. 2A illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2B illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2195 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7600 · $T_s$ | | |

TABLE 1-continued

| | | Normal cyclic prefix in downlink | | | Extended cyclic prefix in downlink | | |
|---|---|---|---|---|---|---|---|
| | | | UpPTS | | | UpPTS | |
| | | Normal | Extended | | | Normal cyclic | Extended cyclic |
| Special subframe configuration | DwPTS | cyclic prefix in uplink | cyclic prefix in uplink | DwPTS | | prefix in uplink | prefix in uplink |
| 5 | $6592 \cdot T_s$ | $4384 \cdot T_s$ | $5120 \cdot T_s$ | $20480 \cdot T_s$ | | $4384 \cdot T_s$ | $5120 \cdot T_s$ |
| 6 | $19760 \cdot T_s$ | | | $23040 \cdot T_s$ | | | |
| 7 | $21952 \cdot T_s$ | | | — | | — | — |
| 8 | $24144 \cdot T_s$ | | | — | | — | — |

Figure 3:
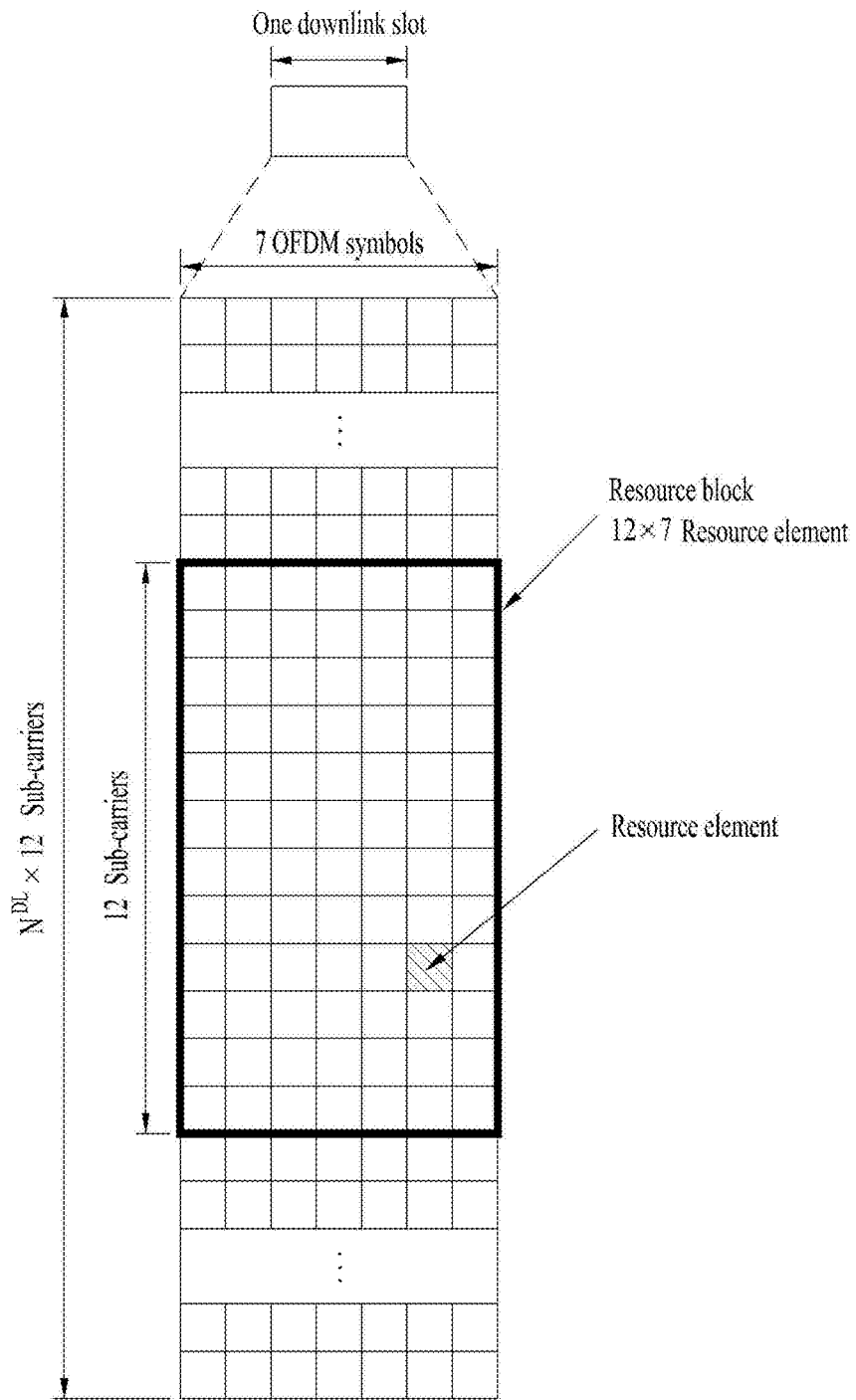
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
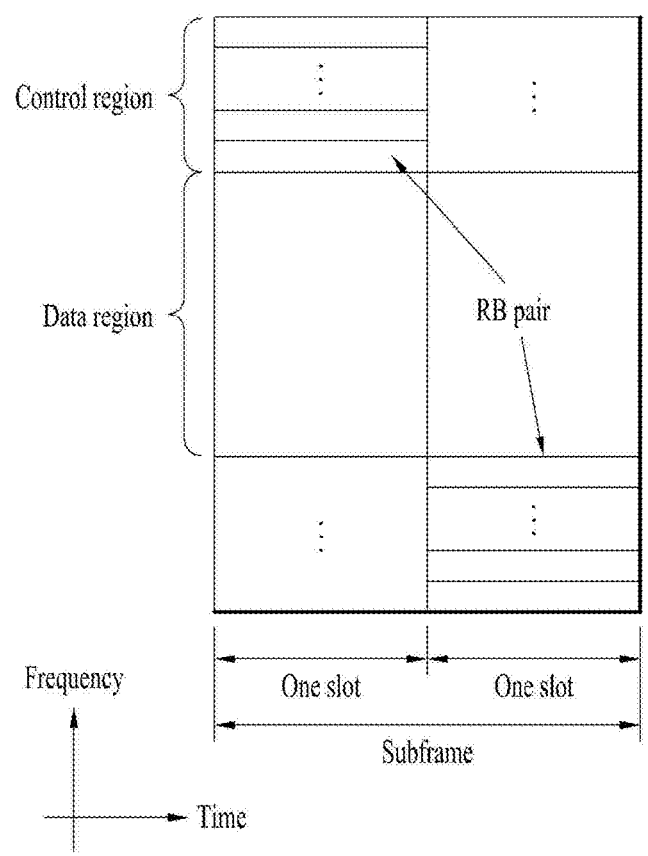
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
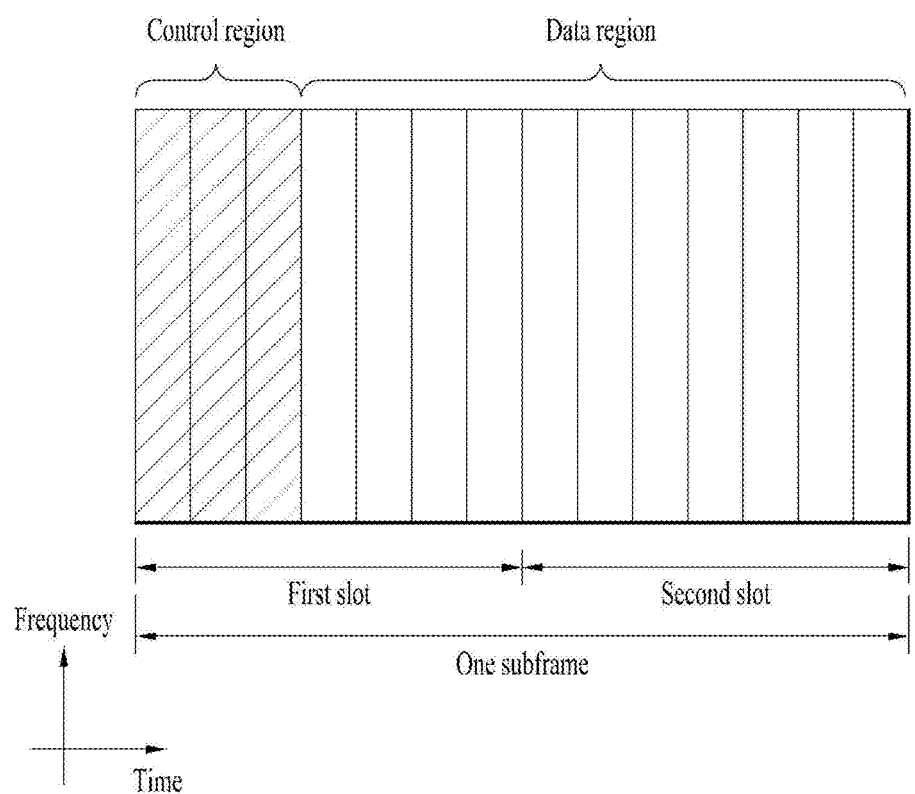
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIB5. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. LTE-U System

2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
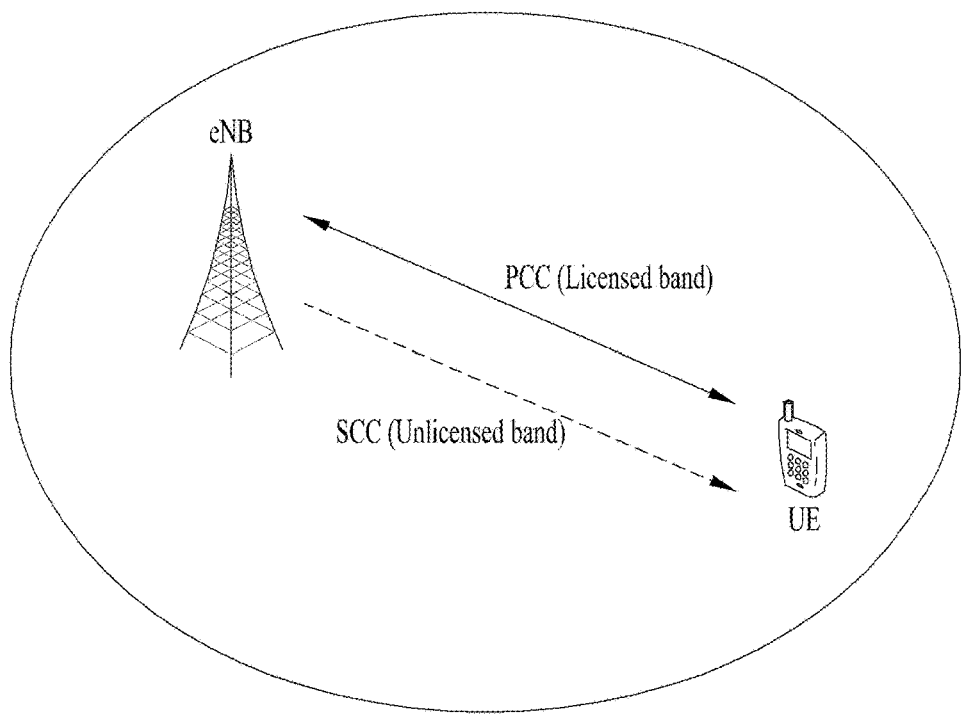
FIG. 6 is a diagram illustrating an exemplary carrier aggregation (CA) environment supported in a long term evolution-unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
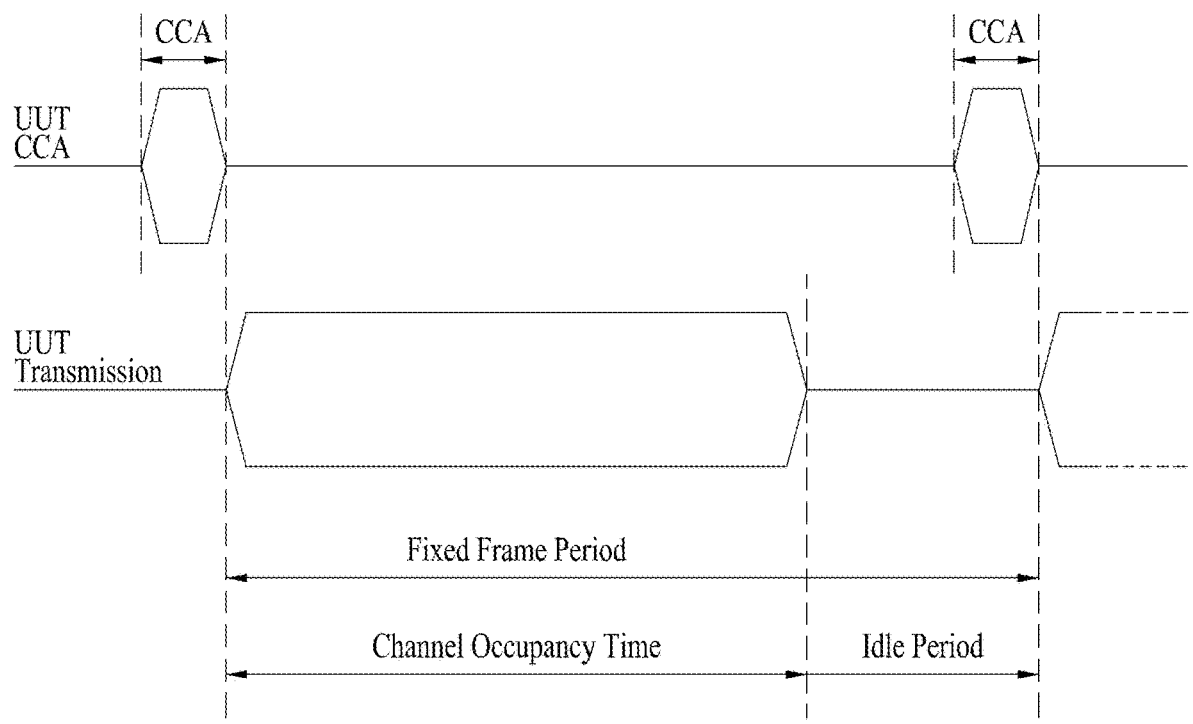
FIG. 7 is a diagram illustrating an exemplary frame based equipment (FBE) operation as one of listen-before-talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
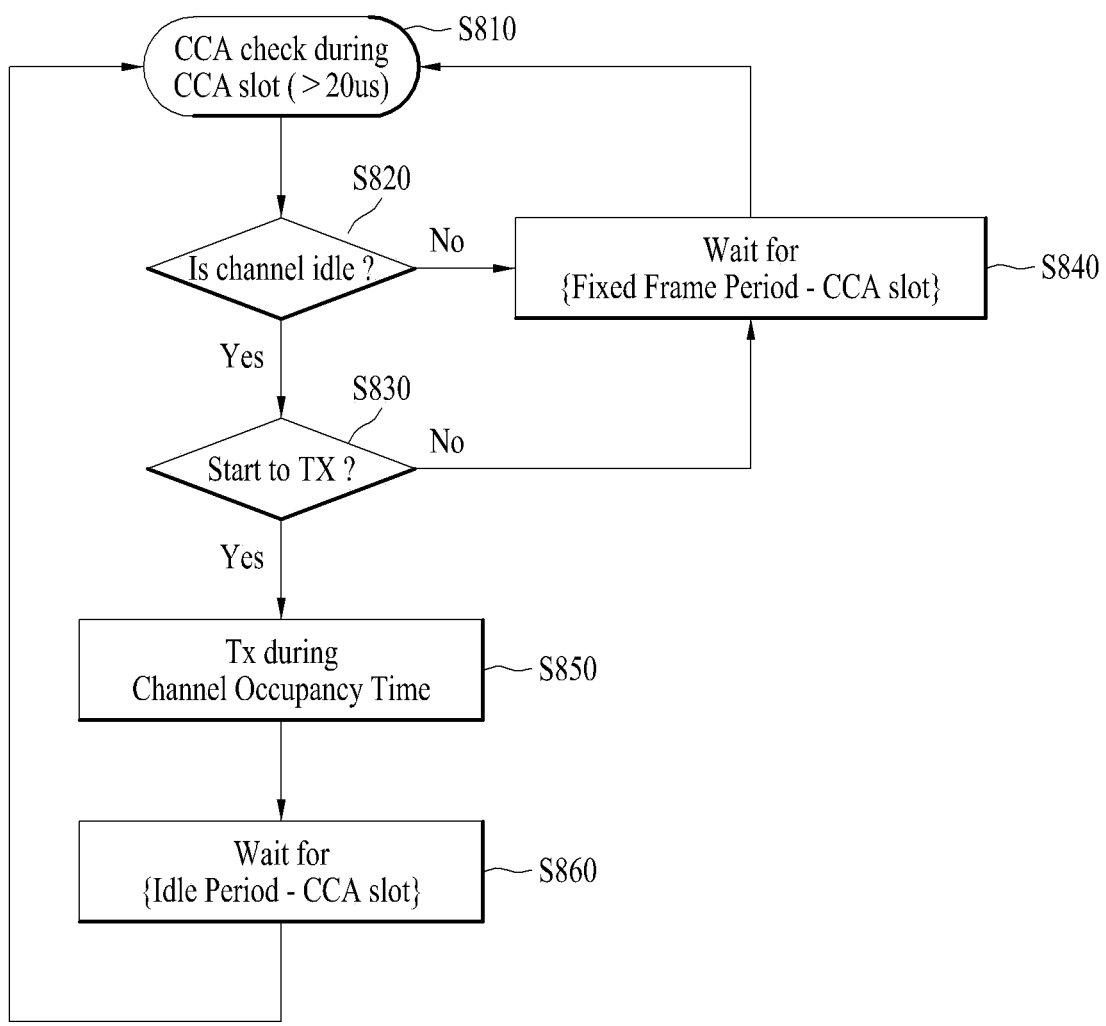
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

Figure 9A:
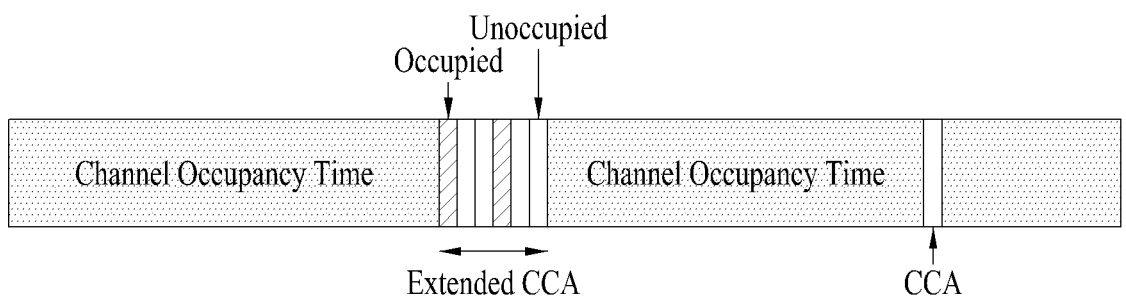
FIGS. 9A and 9B are diagrams illustrating an exemplary load based equipment (LBE) operation as one of the LBT operations.
Figure 9B:
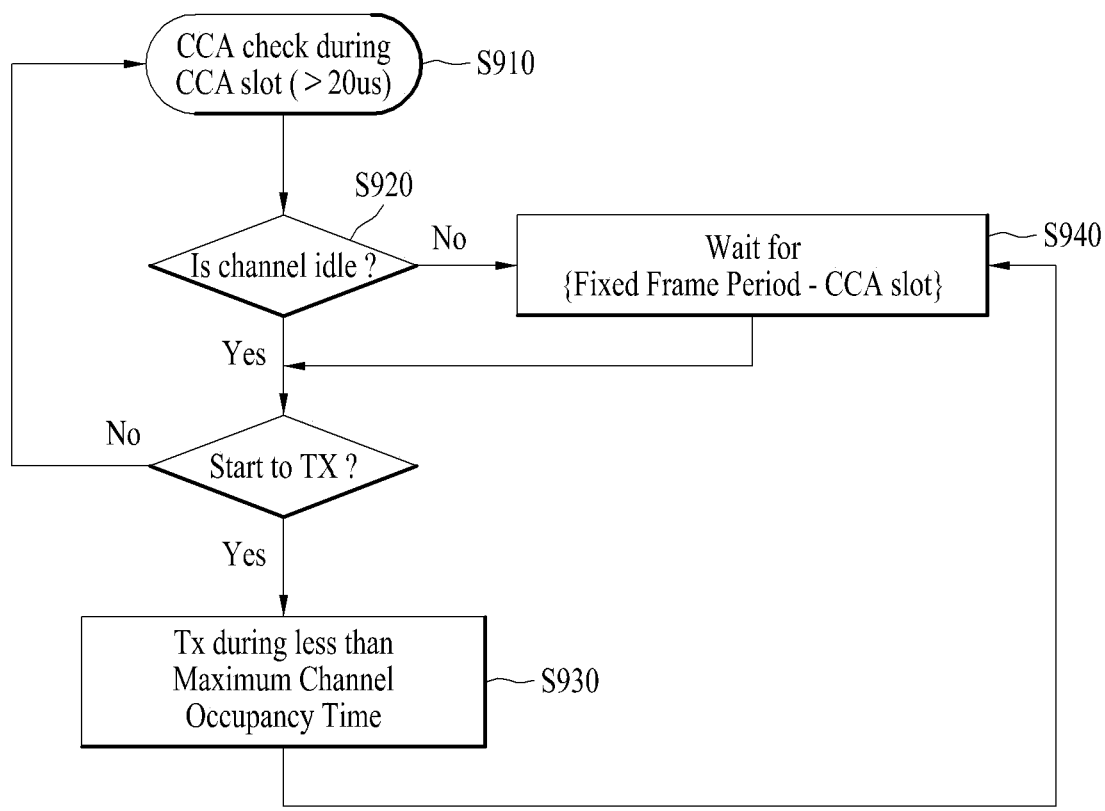

FIGS. 9A and 9B are views illustrating an exemplary LBE operation as one of the LBT operations.

Referring to FIG. 9A, in LBE, the communication node first sets q (q∈{4, 5, . . . , 32}) and then performs CCA during one CCA slot.

FIG. 9B is a block diagram illustrating the LBE operation. The LBE operation will be described with reference to FIG. 9B.

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
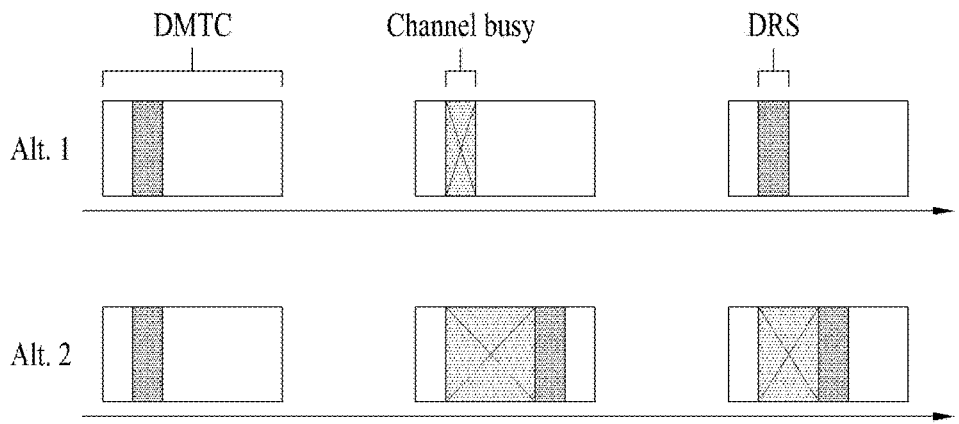
FIG. 10 is a diagram illustrating methods of transmitting a discovery reference signal (DRS) supported in a licensed assisted access (LAA) system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
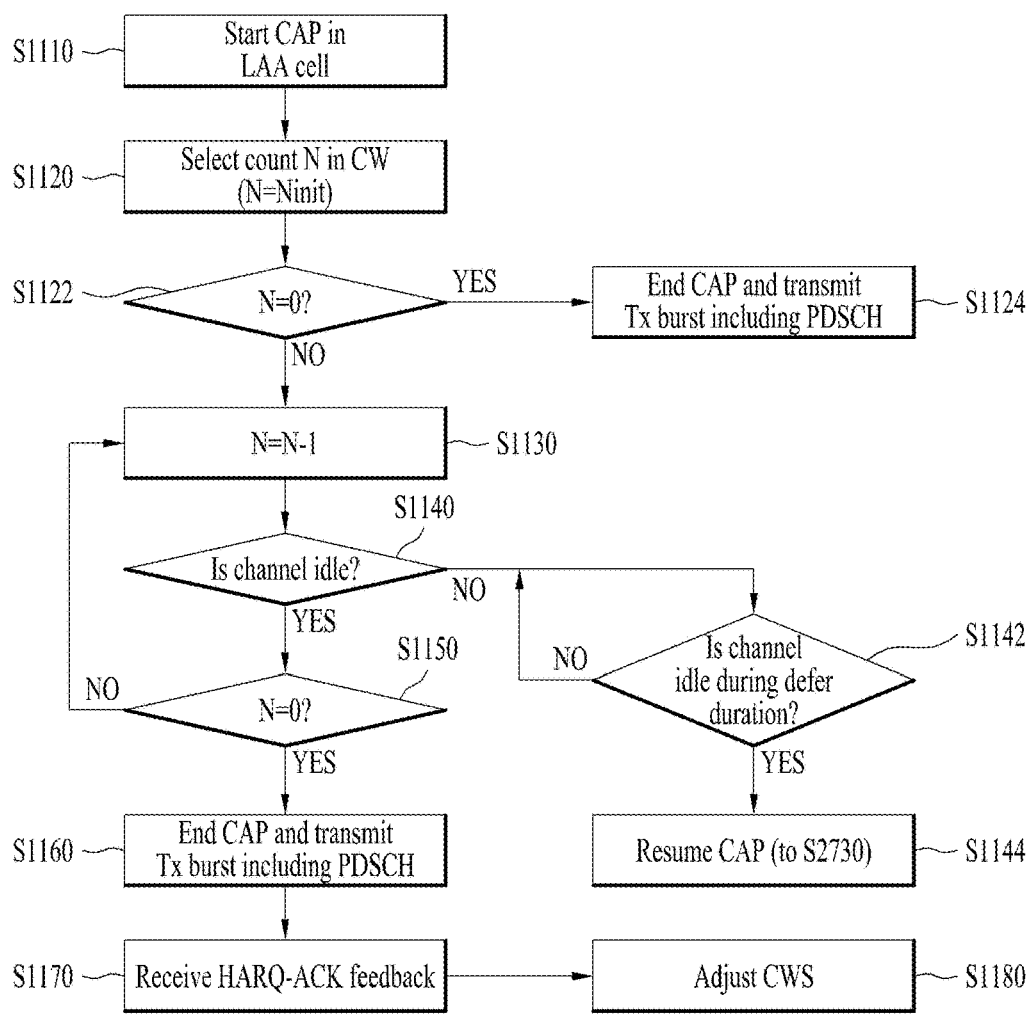
FIG. 11 is a diagram illustrating a channel access procedure (CAP) and contention window adjustment (CWA)

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127, 255,511,1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 12:
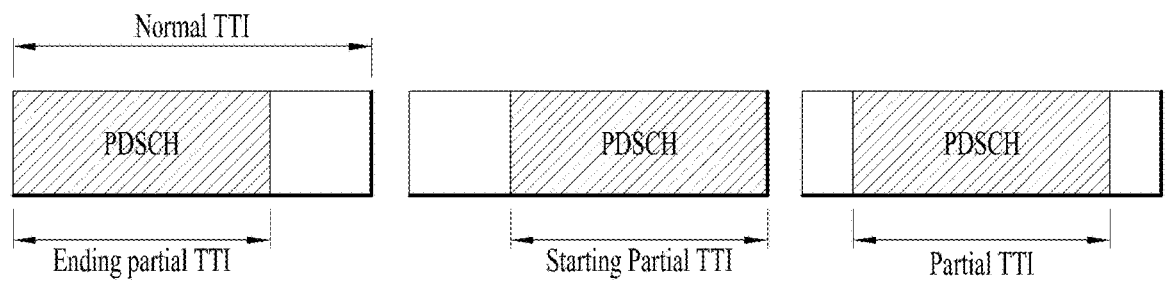
FIG. 12 is a diagram illustrating a partial transmission time interval (TTI) or a partial subframe, which is applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as NewRAT or NR (New Radio).

3.1. Self-Contained Subframe Structure

Figure 13:
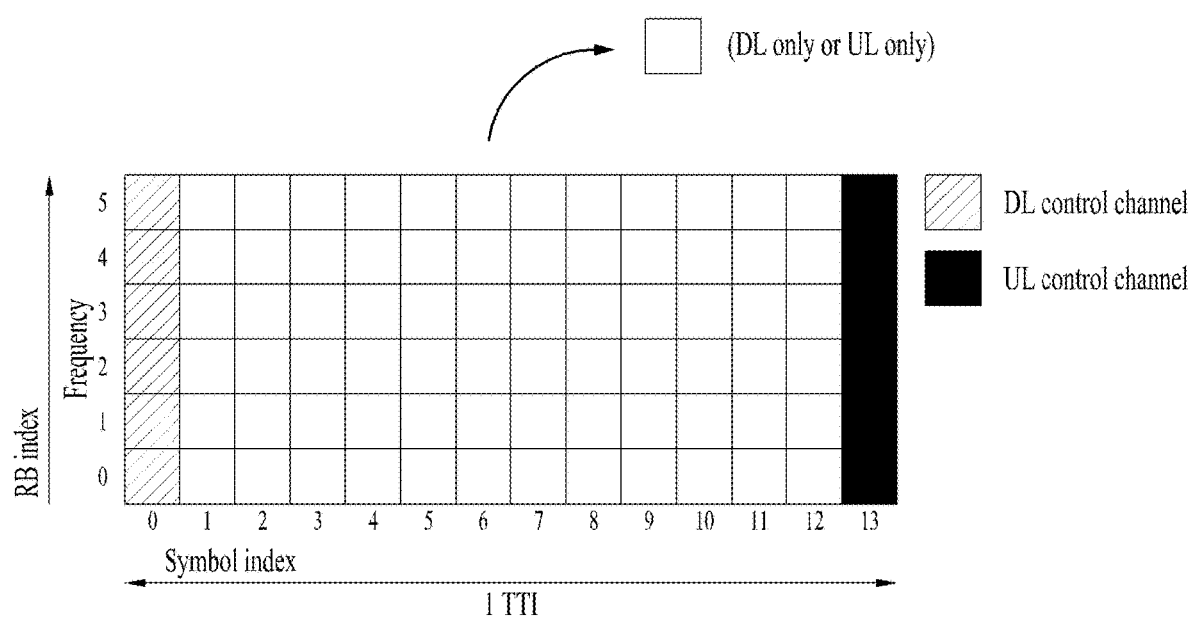
FIG. 13 is a diagram illustrating a self-contained subframe structure applicable to the present invention.

FIG. 13 is a diagram illustrating a self-contained subframe structure applicable to the present invention.

In the NR system to which the present invention is applicable, a self-contained subframe structure as shown in FIG. 13 is proposed in order to minimize data transmission latency in the TDD system.

In FIG. 13, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 13.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

3.2. OFDM Numerology

The NR system uses the OFDM transmission scheme or a similar transmission scheme. Here, the NR system may typically have the OFDM numerology as shown in Table 3.

TABLE 3

| Parameter | Value |
| --- | --- |
| Subcarrier-spacing ($\Delta f$) | 75 kHz |
| OFDM symbol length | 13.33 us |
| Cyclic Prefix(CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 4. Specifically, as disclosed in Table 4, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 4 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 4 are merely an example that is applicable to the NR system according to the present invention, and the values thereof may depend on the implementation method.

TABLE 4

| Parameter | Value | Value | Value | Value |
| --- | --- | --- | --- | --- |
| Subcarrier-spacing ($\Delta f$) | 15 kHz | 30 kHz | 60 kHz | 120 kHz |
| OFDM symbol length | 66.66 | 33.33 | 16.66 | 8.33 |
| Cyclic Prefix(CP) length | 5.20 us/ 4.69 us | 2.60 us/ 2.34 us | 1.30 us/ 1.17 us | 0.65 us/ 0.59 us |
| System BW | 20 MHz | 40 MHz | 80 MHz | 160 MHz |
| No. of available subcarriers | 1200 | 1200 | 1200 | 1200 |
| Subframe length | 1ms | 0.5ms | 0.25ms | 0.125ms |
| Number of OFDM symbol per Subframe | 14 symbols | 14 symbols | 14 symbols | 14 symbols |

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 14:
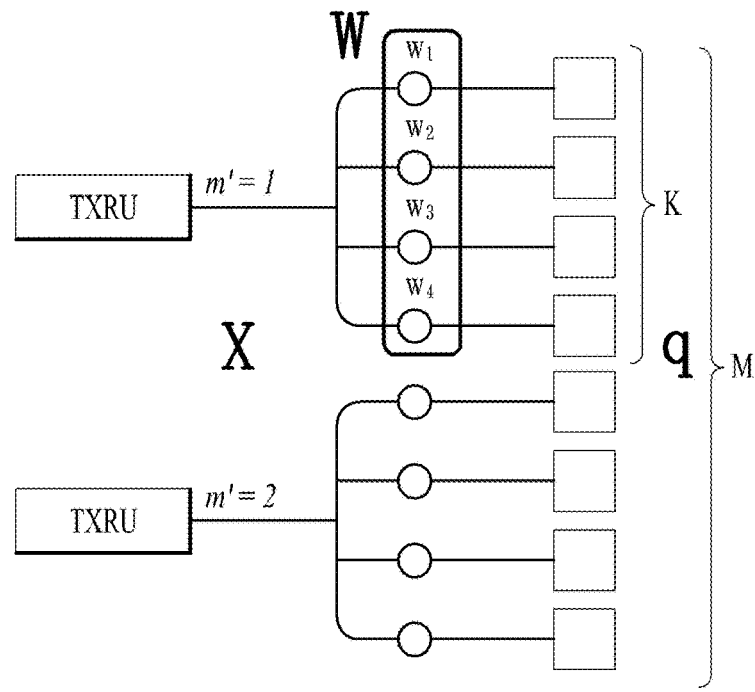
FIGS. 14 and 15 are diagrams illustrating representative methods for connecting TXRUs to antenna elements.
Figure 15:
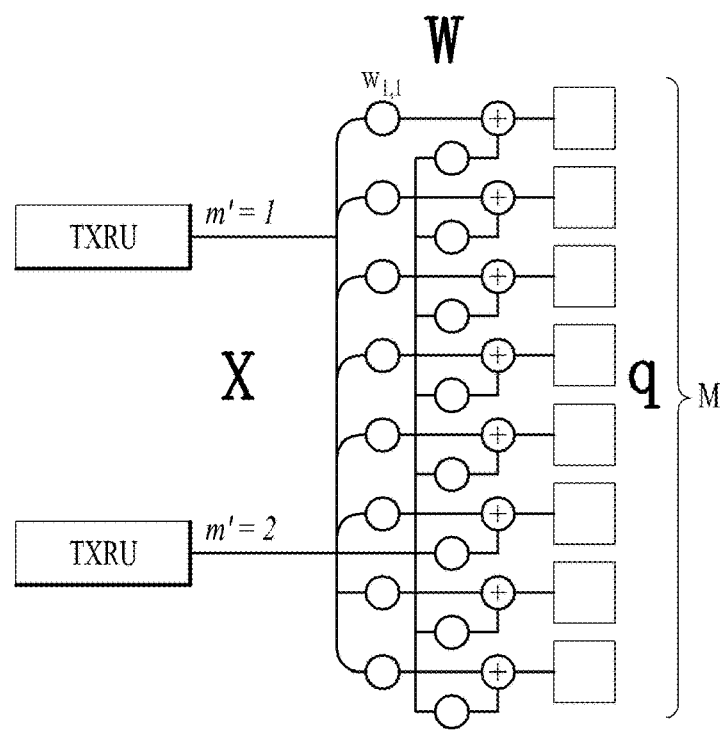

FIGS. 14 and 15 are diagrams illustrating representative methods for connecting TXRUs to antenna elements. Here, the TXRU virtualization model represents the relationship between TXRU output signals and antenna element output signals.

FIG. 14 shows a method for connecting TXRUs to sub-arrays. In FIG. 14, one antenna element is connected to one TXRU.

Meanwhile, FIG. 15 shows a method for connecting all TXRUs to all antenna elements. In FIG. 15, all antenna element are connected to all TXRUs. In this case, separate addition units are required to connect all antenna elements to all TXRUs as shown in FIG. 15.

In FIGS. 14 and 15, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 14 has a disadvantage in that it is difficult to achieve beamforming focusing but has an advantage in that all antennas can be configured at low cost.

On the contrary, the configuration shown in FIG. 15 is advantageous in that beamforming focusing can be easily achieved. However, since all antenna elements are connected to the TXRU, it has a disadvantage of high cost.

4. Proposed Embodiments

The above-described NR system has considered use of not only frequency bands above 6 GHz but frequency bands below 6 GHz. In addition, the NR system has also considered use of unlicensed bands as well as licensed bands. Thus, the present invention proposes operations of the NR system when it operates in an unlicensed band (and more particularly, in the 5 GHz unlicensed band).

In the 5 GHz unlicensed band, LTE-A Pro and LAA(/eLAA) systems as well as IEEE 802.11 a/n/ac(/ax) systems have been already deployed. Thus, if the NR system to which the present invention is applicable is configured to operate in the corresponding band, the NR system should be designed by considering not only fair and efficient coexistence with other systems but also coexistence with other network operators' NR systems.

Meanwhile, the legacy LTE Release-13 LAA system has set its channel raster and bandwidth by considering coexistence with the Wi-Fi system. Specifically, the center frequency has been allowed to have a maximum variation of 200 kHz based on the predefined 20-MHz basis Wi-Fi channel, and the bandwidth has been equally set to 20 MHz. In addition, the Listen Before Talk (LBT) operation (or channel access operation) has been configured to be performed on a 20-MHz basis. Moreover, the LAA system has applied the same subcarrier spacing of 15 kHz as the LTE system.

If 5 GHz band operations are defined for the NR system to which the present invention is applicable in consideration of the above-described matters, the 20-MHz basis LBT method and the subcarrier spacing of 15 kHz may be applied to the NR system. Additionally, the NR system to which the present invention is applicable may consider the introduction of subcarrier spacing higher than 15 kHz. By doing so, the time length of a symbol/subframe can be reduced, and thus the actual transmission time of a reservation signal for simply occupying a channel can be minimized. In addition, when the subcarrier spacing higher than 15 kHz is introduced, a frequency band higher than 20 MHz may also be considered.

Accordingly, the present invention proposes methods for transmitting a DL/UL channel/signal when both of the subcarrier spacing higher than 15 kHz and the frequency band higher than 20 MHz are introduced to the NR system operating in the 5 GHz unlicensed band.

A Discovery Signal (DRS) has been introduced to perform measurement for a deactivated small cell without extra traffic in the legacy LTE (-A) system. The DRS may be configured to be periodically transmitted once every tens of milliseconds (ms). Therefore, an eNB may periodically configure a Discovery Measurement Timing Configuration (DMTC) for a UE on a 6-ms basis, and the UE may receive the DRS in a corresponding DMTC window and then use the received DRS for coarse synchronization, cell detection, RRM measurement, etc. In this case, the RRM measurement may include a Reference Signal Received Power (RSRP) measurement, which is the signal strength from a desired cell, and a Reference Signal Received Quality (RSRQ) measurement, which is the ratio between the signal strength from the desired cell and interference, noise, etc.

The DRS may include signals such as a Primary Synchronization Signal (PSS), a Secondary Synchronization Signal (SSS), a Cell-specific Reference Signal (CRS), etc., and it may further include a Channel State Information-Reference Signal (CSI-RS) if configured.

The NR system to which the present invention is applicable should be able to support serving cell measurement and (intra-frequency or inter-frequency) neighbor cell measurement for the purpose of handling handover due to UE mobility. To this end, a signal for cell search and RRM measurement can be defined for the NR system, similar to the DRS of the LTE system. Hereinafter, such a signal is referred to as an NR-DRS to distinguish from the DRS of the LTE system.

The NR-DRS may include all or some of the following signals: a PSS, an SSS, a Beamforming RS (BRS), a Beam Refinement RS (BRRS), and a CSI-RS. In addition, a gNB may configure a time window where measurement for the NR-DRS will be performed. Hereinafter, such a time window is referred to as an NR-DMTC to distinguish from the DMTC of the LTE system. The NR-DMTC may be configured to have a periodicity of tens (or hundreds) of ms. Thus, it is possible to reduce UE's measurement loads.

In the NR system to which the present invention is applicable, the NR-DRS can be transmitted through beamforming using multiple antennas (particularly, in an mmWave band). In other words, a transmitting end may transmit a signal for a part of the entire cell coverage in each time unit using an analog beam and perform beam sweeping on analog beams in an omnidirectional manner using multiple time units in order to cover the entire cell coverage.

Meanwhile, in the legacy LTE system, a UE may transmit a Physical Random Access Channel (PRACH) in order to achieve uplink synchronization during initial access or in an RRC_CONNECTED/RRC_IDLE mode. Similarly, in the NR system to which the present invention is applicable, a UE may transmit a random access preamble for the same purpose. Specifically, the random access preamble may be transmitted or received through beamforming (particularly, in an mmWave band).

Accordingly, the present invention proposes a method for efficiently transmitting an NR-DRS and a random access preamble (which can be transmitted and received through beamforming) in an unlicensed band based on random access.

Although a subframe (SF) is taken as an example of a time unit with a predetermined length herein, the corresponding configuration can be replaced with at least one slot, Transmission Time Interval (TTI), or symbol of the NR system to which the present invention is applicable.

4.1. DL/UL Channel/Signal Transmission Method

The DL/UL channel/signal transmission method proposed by the present invention can be categorized based on the following two approaches.

Approach 1: The system bandwidth is set to 20 MHz regardless of subcarrier spacing.

Approach 2: The system bandwidth can be higher than 20 MHz.

Hereinafter, particular operations will be described in detail regarding each of the two approaches.

4.1.1. Approach 1 (System Bandwidth Is Set to 20 MHz Regardless of Subcarrier Spacing)

According to the present method, the system bandwidth may be set to 20 MHz regardless of subcarrier spacing, but the subcarrier spacing may increase only in the first (or first some) time unit (e.g., SF) of a transmission burst in order to minimize the transmission time of a reservation signal for simply occupying a channel. Specifically, if a base station or a terminal does not initiate data transmission at a subframe boundary starting point due to LBT failure while operating with subcarrier spacing of $f_0$ (e.g., 15 kHz) in the NR system to which the present invention is applicable, the base station or terminal may attempt signal transmission configured with a Transmission Time Interval (TTI) shorter than subframe duration before attempting data transmission in a next subframe. Alternatively, if a base station or a terminal does not initiate data transmission at a subframe boundary starting point due to LBT failure while operating with subcarrier spacing of $f_0$ (e.g., 15 kHz), the base station or terminal may transmit a signal in a shorter subframe by applying subcarrier spacing (e.g., 30 or 60 kHz) greater than $f_0$.

Figure 16:
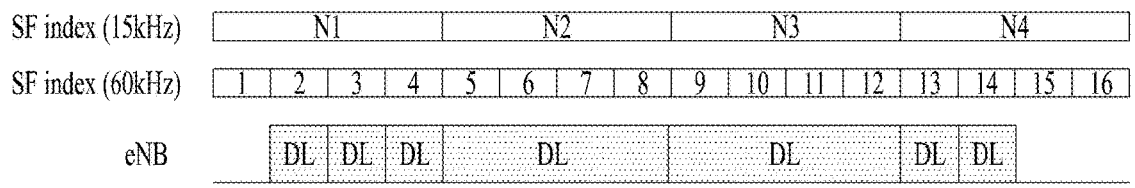
FIG. 16 illustrates a configuration in which while operating with subcarrier spacing of 15 kHz basically, a gNB transmits a signal by configuring a TTI shorter than a normal TTI or increasing the subcarrier spacing.

FIG. 16 illustrates a configuration in which while operating with subcarrier spacing of 15 kHz basically, an NR-based base station (i.e., new generation NodeB (gNB)) transmits a signal by configuring a TTI shorter than a normal TTI or increasing the subcarrier spacing.

In the present specification, a base station operating in the NR system is referred to as a gNB to distinguish it from an eNB, which is an example of the LTE base station, but the gNB can be replaced with the eNB in some embodiments.

As shown in FIG. 16, while operating with the subcarrier spacing of 15 kHz basically, the gNB may configure a TTI (e.g., 2 or 4 symbols) shorter than the duration (i.e., 1 or 0.5 ms) of a time unit (e.g., a subframe or a slot) at the starting point of a transmission burst (to simply minimize the transmission time of a signal for channel occupation) and then transmit a DL signal. Alternatively, while operating with the subcarrier spacing of 15 kHz basically, the gNB may change the subcarrier spacing to 60 kHz and then transmit a DL signal until a next 15 kHz subframe boundary (i.e., SF #N2) using a subframe shorter than 1 ms (e.g., 0.25 ms).

This signal transmission method can be equally applied to the starting and ending points of a transmission burst. In particular, when the signal transmission method is intended to be applied to the ending point of the transmission burst, whether the signal transmission method will be applied or not may be indicated by the previous subframe.

In addition, the signal transmission method may be applied not only to DL transmission but also to UL transmission in the same manner, and in the case of UL transmission, whether the corresponding method will be applied may be indicated to a UE through DCI.

However, as an exceptional case, it may be undesirable to change the numerology such as subcarrier spacing in a subframe where transmission of (some of) the following signals is reserved. Thus, the above-described signal transmission method may not be applied to the subframe where (some of) the following signals will be transmitted.

Synchronization signal (e.g., PSS, SSS, etc.)

Beamforming-related signal (e.g., beamforming reference signal, beam refinement reference signal, etc.)

RRM measurement related signal (e.g., beamforming reference signal)

CSI measurement related signal (e.g., CSI-RS)

Alternatively, if the above-described signal transmission method is applied to the subframe where the transmission of (some of) the above signals is reserved, a rule may be established such that (some of) the above signals to be transmitted in the corresponding subframe are dropped. For example, the above-described signal transmission method may not be applied to a subframe including a PSS/SSS configured to be transmitted with a periodicity of 5 ms. Alternatively, if the corresponding method is applied, the PSS/SSS may not be transmitted in the subframe.

In the LTE system, an update of a contention window size (CWS) for DL/UL transmission is defined based on HARQ-ACK information corresponding to a reference subframe. In addition, since the partial subframe of FIG. 12 can be applied both to DL/UL, a reference subframe for the partial subframe can also be considered.

In this case, if a short TTI (sTTI) or a subframe configured with relatively large subcarrier spacing is transmitted at the starting point of a transmission burst as proposed by the present invention, the definition of the reference subframe may be changed.

For example, when the sTTI is transmitted,

1> only the first sTTI may be defined as the reference subframe,

2> all sTTIs in a corresponding subframe may be defined as the reference subframe, 3> the next subframe as well as all STTIs in the corresponding subframe may be defined as the reference subframe, or 4> the next subframe may be defined as the reference subframe except the subframe including the sTTI.

Hereinafter, an example will be described with reference to FIG. 16. When signal transmission and reception is performed on a subframe configured with relatively large subcarrier spacing as shown in FIG. 16, A> only SF #2 may be defined as the reference subframe, B> SFs #2/3/4 within SF #N1 duration may be all defined as the reference subframe, C> SF #N2 as well as SFs #2/3/4 within SF #N1 duration may be defined as the reference subframe, or D> SF #N2 corresponding to the next subframe may be defined as the reference subframe except SFs #2/3/4 within SF #N1 duration.

4.1.2. Approach 2 (System Bandwidth Higher than 20 MHz Is Allowed)

4.1.2.1 First Method

Figure 17:
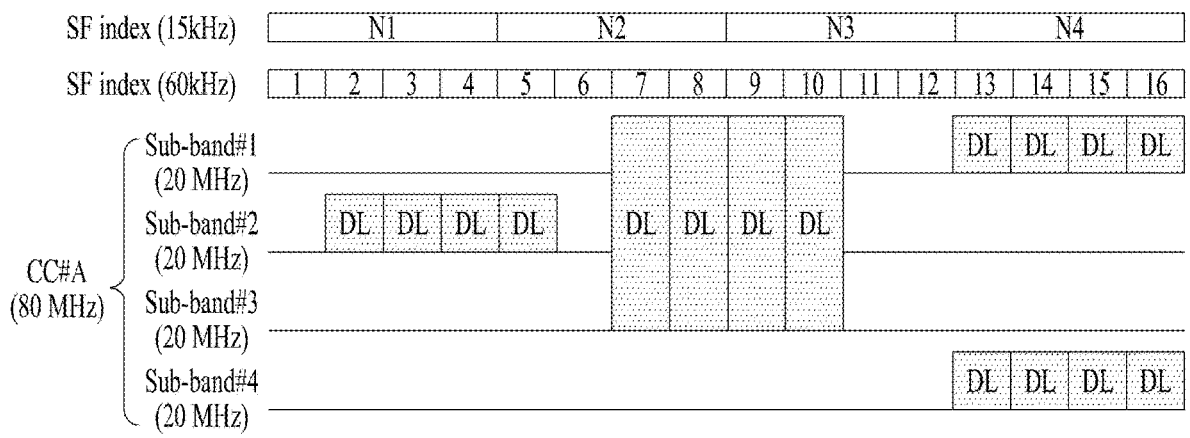
FIG. 17 illustrates a configuration in which the bandwidth of a signal transmitted by a base station or a terminal varies due to change in subcarrier spacing.

FIG. 17 illustrates a configuration in which the bandwidth of a signal transmitted by a base station or a terminal varies due to change in subcarrier spacing.

When subcarrier spacing of 60 kHz is introduced as shown in FIG. 17, the length of a time unit (e.g., subframe) can be reduced to ¼ compared to subcarrier spacing of 15 kHz. In addition, the system bandwidth may be set to 80 MHz, which is four times greater compared to the subcarrier spacing of 15 kHz.

In this case, the base station or terminal may perform LBT for each subband of 20 MHz and transmit data using only the subbands where the LBT is successful. For convenience of description, it is assumed that one subband is 20 MHz and one Component Carrier (CC) has a bandwidth of 80 MHz. However, in general, the subband may mean a bandwidth where a base station and a terminal can perform the LBT independently, and the bandwidth of one CC may be configured differently depending on subcarrier spacing and system characteristics.

4.1.2.1.1. Method of Configuring Control Channel

Since data/signal transmission per subband is basically determined according to LBT results at a base station or terminal, a control channel may be configured such that it does not overlap across multiple subbands. In other words, when one NR-PDCCH (i.e., a DL control channel carrying DL/UL scheduling information in the NR system) is transmitted on resources for multiple subcarriers in the NR system to which the present invention is applicable, there may be a restriction that all subcarriers and resources constituting the one NR-PDCCH should belong to one same subband.

In addition, if a search space where each UE should perform Blind Detection (BD) for the NR-PDCCH and the number of BD rounds are configured per subframe, the search space and the number of BD rounds may vary per subband.

For example, similar to the legacy LTE system, the number of BD candidates for the NR-PDCCH may be configured per Aggregation Level (AL). Thus, the number of BD candidates for the NR-PDCCH may be basically set such that when the AL is 1/2/4/8, the BD should be performed 6/6/2/2 times, respectively. In this case, the BD may be configured to be performed 2/2/0/0 times per AL for subband #1, 1/1/1/1 time per AL for subband #2, 2/2/0/0 times per AL for subband #3, and 1/1/1/1 time per AL for subband #4.

As another example, when the AL is 1/2/4/8, the BD may be configured to be performed 6/6/2/2 times (or 4/4/1/1 times equally reduced) for each subband.

4.1.2.1.2. Method of Transmitting Data Channel Corresponding to NR-PDCCH

When the restriction that all resources constituting one NR-PDCCH should be included in one same subband is established as described in section 4.1.2.1 by considering that signal transmission per subband is determined according to LBT results due to the characteristics of an unlicensed band, there may be a restriction that a data channel corresponding to the NR-PDCCH should be included in one same subband. In this case, since HARQ-ACK is separately transmitted per subband, a CWS value may be updated per subband, and LBT may be performed separately.

Alternatively, if the data channel corresponding to the NR-PDCCH can be transmitted in any subband regardless of the subband in which the NR-PDCCH is actually transmitted in spite of the restriction that all resources constituting one NR-PDCCH should be included in the same subband as described in section 4.1.2.1, it may be difficult for a base station and a terminal to update the CWS value per subband.

In this case, it may be desirable that all subbands have a common CWS value rather than different CWS values. Specifically, the base station and terminal may update CWS values based on HARQ-ACK for all subbands, perform the LBT by extracting (or selecting) a random backoff value per subband based on the common CWS value, and then attempt transmission in a specific subband. By doing so, the base station and terminal may initialize all backoff counter values.

In general, the gNB may perform a series of processes such as Transport Block (TB) generation, encoding, scrambling, interleaving, Resource Element (RE) mapping, etc. at least in SF #n-1 for DL data to be transmitted in SF #n. However, if the subband to be actually transmitted varies according to an LBT result performed immediately before the boundary of SF #n, it may be difficult for the gNB to perform DL data transmission according to the transmission subband.

To solve the above problem, a method of performing RE mapping in advance by dividing one same TB on a subband basis may be considered. For example, in the case of frequency-first RE mapping, a base station or a terminal may first perform the RE mapping on all symbols in a specific subband with respect to all frequencies and then continue to perform the RE mapping in other subbands. In this case, if the base station or terminal is configured to transmit a signal in the specific subband according to LBT results, the base station or terminal may transmit the signal by simply puncturing subbands where transmission is impossible within a previously configured subframe.

4.1.2.1.3. RSSI Measurement Method

In the LTE Release-13 LAA system, a UE has been configured to separately perform RSSI measurement for carrier selection in an unlicensed band and report an average RSSI value and channel occupancy (i.e., a percentage of samples having RSSI values higher than a threshold). To this end, an RSSI Measurement Timing Configuration (RMTC) has been introduced for the corresponding measurement, and the RMTC has been set independently from a Discovery Signal (DRS) Measurement Timing Configuration (MTC) for DRS transmission.

For the same or similar reasons, the RMTC and RSSI measurement can be introduced to the NR to which the present invention is applicable.

However, in the NR system to which the present invention is applicable, the RMTC may vary per subband or the RSSI measurement (e.g., the average RSSI value and/or channel occupancy) may be performed and reported independently. This is because interference from Wi-Fi and LAA systems may be differently measured in each subband.

4.1.2.1.4. UL Resource Allocation Method

In the LTE Release-14 eLAA system, a new method has been introduced for UE's UL transmission in an unlicensed band. To this end, an RB-interlaced PUSCH transmission method has been applied by considering regulations related to occupied bandwidth and power spectral density.

The RB-interlaced PUSCH transmission means that PUSCH resources are allocated on an interlace basis. For example, a 100-RB system (i.e., system bandwidth of 20 MHz) may be composed of a total of 10 interlaces, each of which may be composed of 10 RBs. Alternatively, a 50-RB system (i.e., system bandwidth of 10 MHz) may be composed of a total of 5 interlaces, each of which may be composed of 10 RBs. In this case, the RBs constituting each interlace may be equally distributed at intervals of 10 RBs. For the RB-interlaced PUSCH transmission, the PUSCH resources may be basically allocated to a UE on the interlace basis. Particularly, the PUSCH resources may be allocated to the UE on a 10-RB basis, 20-RB basis, or 30-RB basis.

Similarly, UL resources in an unlicensed band may be scheduled to at least one UE in the NR system to which the present invention is applicable. In this case, if an NR base station is able to share its occupied channel occupancy with UEs associated therewith, the NR base station may restrict the UEs to perform UL transmission only in subbands where the NR base station succeeds in LBT.

To this end, the NR base station may inform the UEs of subbands where UL channel transmission is allowed in addition to the RB-interlace PUSCH transmission. For example, if the NR base station intends to share DL channel occupancy secured through subbands #1/2/3 of SFs #7/8/9/10 with different UEs, the NR base station may transmit, to the UEs, information indicating that UL transmission (e.g., PUSCH, PUCCH, PRACH, etc.) should be attempted in subbands #1/2/3 rather than the entire system bandwidth. This information may be transmitted via UE-specific DCI or cell-common (or UE-group-specific) DCI.

4.1.2.1.5. Method of Configuring Resources for NR-PRACH (Physical Channel Carrying Preamble in NR System)

Since transmission per subband may be determined according to LBT results as described in section 4.1.2.1.1, one PRSACH transmission resource may be configured such that it does not overlap across a plurality of subbands.

4.1.2.1.6. Method of Configuring SRS Transmission Bandwidth

In the LTE Release-14 eLAA system, an SRS can be transmitted in only the last symbol of a specific SF as in the legacy LTE system. In particular, only wideband SRS transmission is allowed. For example, in a 100-RB system, the SRS can be distributedly transmitted over center 96 RBs. In this case, the number of applied combs may be set to either 2 or 4 according to the configuration.

As described in section 4.1.2.1.4, when a base station is able to share its occupied channel occupancy with UEs associated therewith, the base station may restrict the UEs to perform UL transmission only in subbands where the base station succeeds in LBT. In other words, the SRS transmission may be limitedly performed only in the subband where the base station succeeds in the LBT or some thereof rather than wideband. Accordingly, additional signaling about the SRS bandwidth may be required. Such information may be transmitted through UE-specific DCI or cell-common (or UE-group-specific) DCI.

4.1.2.2. Second Method

When a dynamically transmittable subband varies according to LBT results as described in the first method, the complexity of a TB configuration method at a gNB/UE, PDCCH BD at a UE, etc. may increase. By considering the complexity increase, only when LBT is successful for the entire system bandwidth, the gNB/UE may be configured to attempt DL/UL transmission in the entire system bandwidth. Otherwise, the gNB/UE may be configured not to attempt the DL/UL transmission. Alternatively, when the LBT is not successful, the gNB/UE may be configured to attempt the DL/UL transmission only in a set of specific subbands.

Figure 18:
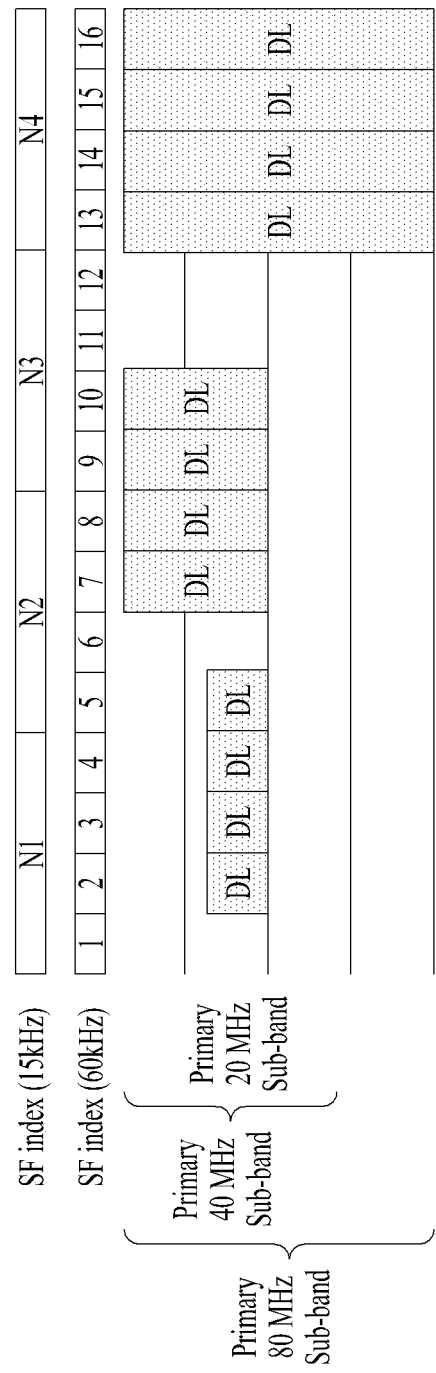
FIG. 18 illustrates a configuration in which a transmittable subband set is configured in each bandwidth and a signal is transmitted in each subband set according to LBT results.

FIG. 18 illustrates a configuration in which a transmittable subband set is configured in each bandwidth and a signal is transmitted in each subband set according to LBT results. Although FIG. 18 shows a DL case only, the configuration illustrated in FIG. 18 can be applied to a UL case.

Specifically, as shown in FIG. 18, transmittable subband sets can be configured for bandwidths of 20, 40, and 80 MHz, respectively. Next, a base station may attempt DL transmission only in allowed subband sets selected according to the LBT results.

4.1.2.2.1. Signal/Channel Transmittable Only in Primary Subband of 20 MHz

According to the present invention, some or all of the following signals/channels can be transmitted only in the primary subband of 20 MHz.
Synchronization signal (e.g., PSS, SSS, etc.)
Beamforming-related signal (e.g., beamforming reference signal, beam refinement reference signal, etc.)
RRM measurement related signal (e.g., beamforming reference signal)
Broadcast information (e.g., PBCH, system information, paging, random access response, transmission burst length, channel occupancy time, primary 20 MHz subband information. etc.)
Random access preamble
Scheduling request

4.1.2.3. Method of Configuring Subband Set

A subband set where signal transmission is allowed can be configured by L1 or higher layer signaling (e.g., RRC signaling). In this case, gNBs provided by the same operator may set the same primary 20 MHz subband. In addition, a DL subband set may be different from a UL subband set.

4.1.2.4. TB Configuration Method

According to the present invention, a method of configuring a TB for DL/UL transmission may be determined as follows. First, a gNB/UE may separately configure a TB in each transmittable subband set, perform LBT, and then attempt DL/UL transmission by selecting one of the configured TBs in each subband set where the LBT is successful.

4.2 NR-DRS Transmission Method

As described above, an NR-DRS can be transmitted through beamforming or beam sweeping over multiple time units.

Figure 19A:
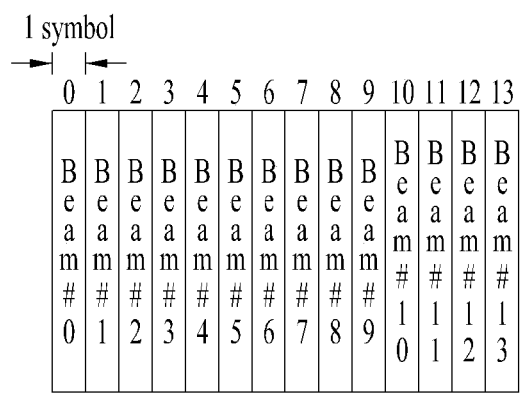
FIGS. 19A and 19B illustrate the index of an analog beam used for NR-DRS transmission per symbol in one subframe according to the present invention.
Figure 19B:
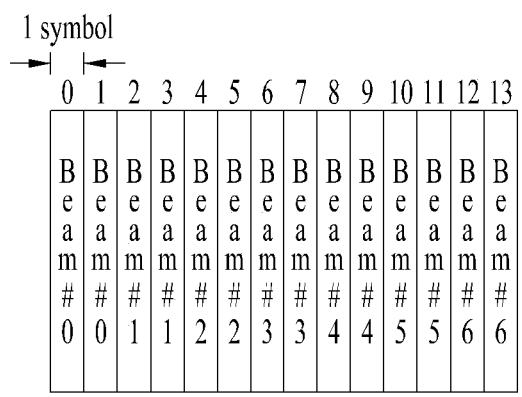

FIGS. 19A and 19B illustrate the index of an analog beam used for NR-DRS transmission per symbol in one subframe according to the present invention.

Referring to FIG. 19A, a gNB may perform NR-DRS transmission by forming a different beam in each symbol of a subframe, which is composed of 14 symbols. In this case, PSS/SSS/BRS(/PBCH) constituting the NR-DRS may be distributedly transmitted in the individual symbols.

Alternatively, referring to FIG. 19B, the gNB may perform the NR-DRS transmission on multiple symbols using one same beam. In this case, an NR-DRS including PSS/SSS may be transmitted in the first symbol of two symbols configured with the same beam, and an NR-DRS including BRS(/PBCH) may be transmitted in the second symbol. Alternatively, one same sequence may be repeated and transmitted in multiple symbols. Further, for the transmission, a different SF and different numerology may be applied (for example, it is possible to increase a symbol length by applying small subcarrier spacing).

Such an NR-DRS configuration method (or whether measurement should be performed by using only one sample (one-shot measurement) or by accumulating multiple time samples) may be indicated through a certain SF except the SF in which the DRS is transmitted on a licensed or unlicensed carrier (via L1 signaling or higher layer signaling). For example, a NR-DRS transmitted in a specific symbol may include information on cell/Transmission and Reception Point (TRP)/beam ID and/or symbol/SF/SF group index.

Hereinafter, an SF capable of transmitting an NR-DRS as shown in FIGS. 19A and 19B is referred to as a DRS SF for convenience of description. In addition, a symbol region in which the NR-DRS is transmitted is referred to as a DRS occasion.

FIGS. 19A and 19B show that the NR-DRS is transmitted over all symbols of the DRS SF. However, in another example, the NR-DRS may be configured not be transmitted in some symbols (e.g., first or last two symbols) of the DRS SF even though the DRS occasion is composed of 14 symbols.

4.2.1. First NR-DRS Transmission Method

A DRS SF may be configured with a predetermined periodicity. In this section, a NR-DRS transmission method when the number of DRS SF candidates that can be transmitted in each period is 1 will be described in detail.

(1) If a gNB fails in LBT before transmitting a DRS SF (i.e., if a channel is busy), the gNB may not perform transmission in the corresponding DRS SF.

(2) Even if a gNB fails in LBT before transmitting a DRS SF, the gNB may continue to perform the LBT. Thereafter, the gNB may attempt transmission from the time (or symbol) when the LBT is successful to a next SF boundary.

Figure 20A:
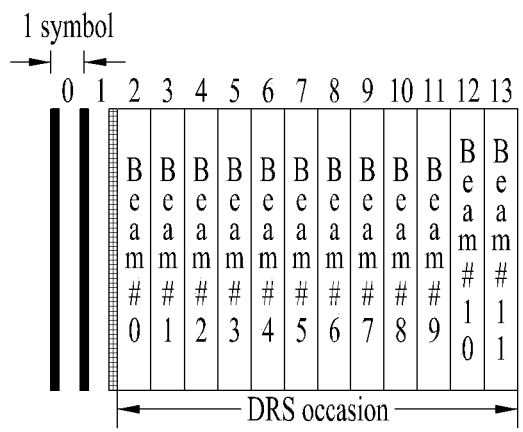
FIGS. 20A and 20B illustrate an NR-DRS transmission method according to an embodiment of the present invention.
Figure 20B:
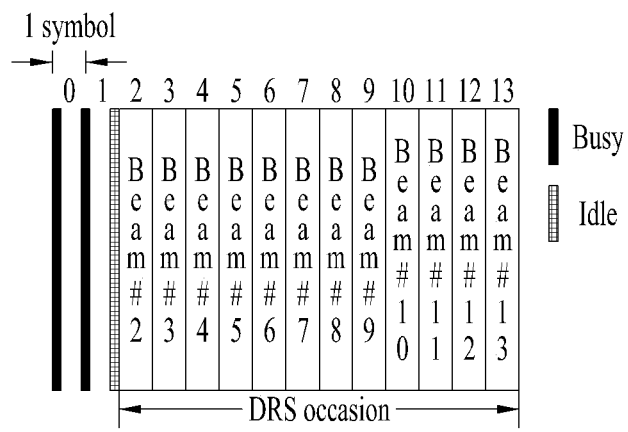

FIGS. 20A and 20B illustrate an NR-DRS transmission method according to an embodiment of the present invention.

As shown in FIGS. 20A and 20B, if a gNB fails in LBT before start of symbols #0/1 but succeeds in the LBT immediately before symbol #2, the gNB may perform NR-DRS transmission from symbol #2 to symbol #13. In this case, an NR-DRS in symbol #0 could be transmitted in symbol #2 as shown in FIG. 20A. Alternatively, the NR-DRS transmission may be performed after puncturing NR-DRSs in symbols #0/1 as shown in FIG. 20B.

If an NR-DRS contains information on a symbol, SF, and/or SF group index, it may be desirable to perform transmission by puncturing an NR-DRS(s) as shown in FIG. 20B. This is because if the NR-DRS transmission is performed as shown in FIG. 20A, it may be observed by a UE that the beam direction of an NR-DRS varies according to a gNB's transmission starting time.

Additionally, when an NR-DRS is transmitted over multiple symbols in the same direction as shown in FIG. 19B, if a gNB is unable to transmit the NR-DRS in some symbols according to LBT results, the gNB may drop the entire NR-DRS transmission in the corresponding beam direction. In other words, if the gNB fails in the LBT before symbol #8 (i.e., beam #4) but succeeds in the LBT before symbol #9 (i.e., beam #4), the gNB may not perform the NR-DRS transmission in symbol #9.

4.2.2. Second NR-DRS Transmission Method

In section 4.2.1, the NR-DRS transmission method when the number of DRS SF candidates that can be transmitted in each period is 1 has been described. However, the number of DRS SF candidates that can be transmitted in each period may be set to 2 or more in order to increase NR-DRS transmission probability. Therefore, a NR-DRS transmission method when there are a plurality of DRS SF candidates will be described in this section.

(1) Similar to (1) of the above-described first NR-DRS transmission method, if a gNB fails in LBT before transmitting a DRS SF (i.e., if a channel is busy), the gNB may not perform transmission in the corresponding DRS SF but perform the LBT again before transmitting a next DRS SF.

(2) Similar to (2) of the above-described first NR-DRS transmission method, even if a gNB fails in LBT before transmitting a DRS SF, the gNB may continue to perform the LBT. Thereafter, the gNB may attempt transmission from the time (or symbol) when the LBT is successful to a next SF boundary.

(3) Since the maximum region in which an NR-DRS can be transmitted may be greater than a DRS occasion, a gNB may be allowed to continuously perform transmission from a symbol where LBT is successful until the end of the DRS occasion. In other words, the gNB may continuously transmit the NR-DRSs from the symbol where the LBT is successful until the end of the DRS occasion.

FIGS. 21A and 21B illustrates an NR-DRS transmission method according to another embodiment of the present invention.

If a gNB succeeds in LBT before symbol #2, the gNB may perform NR-DRS transmission from symbol #2 using beams #0 to #13 as shown in FIG. 21A. Alternatively, if a gNB succeeds in LBT before symbol #2, the gNB may perform NR-DRS transmission from symbol #2 of the first SF using beams #2 to #13 and then continue the NR-DRS transmission in symbols #0 and #1 using beams #0 and #1, respectively.

In this case, if an NR-DRS contains information on a symbol, SF, and/or SF group index, it may be desirable to transmit the NR-DRS after cyclic rotation as shown in FIG. 21B.

Additionally, when an NR-DRS is transmitted over multiple symbols in the same direction as shown in FIG. 19B, if a gNB is unable to transmit the NR-DRS in some symbols according to LBT results, the gNB may drop the entire NR-DRS transmission in the corresponding beam direction.

(4) When NR-DRS transmission is performed as described in (3), DL/UL channels over 2 SFs may not be multiplexed. In other words, in an SF including an NR-DRS, multiplexing with another DL/UL channel is not allowed.

Figure 22A:
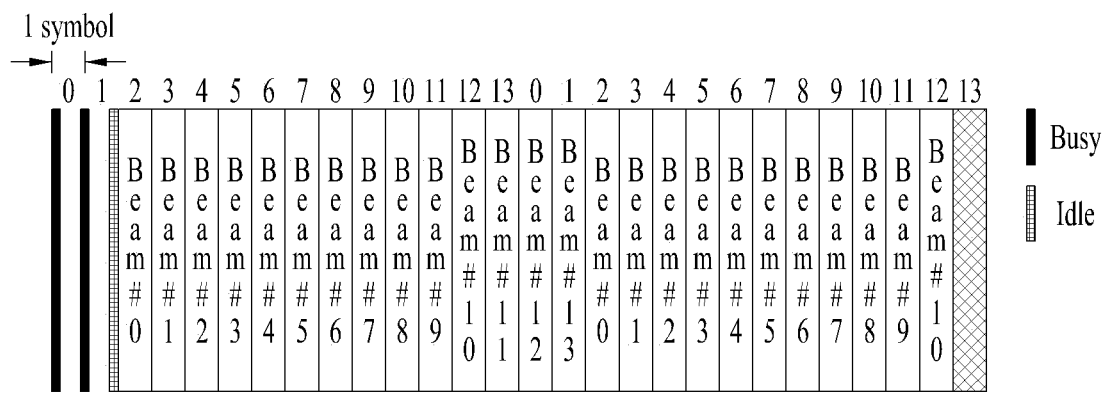
FIGS. 22A and 22B illustrate an NR-DRS transmission method according to a further embodiment of the present invention.
Figure 22B:
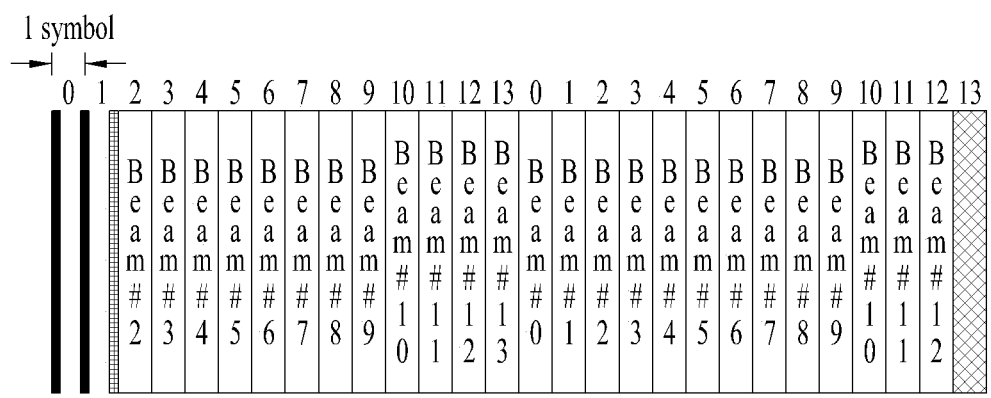

To use resources more efficiently, the NR-DRS transmission may be allowed until a next SF boundary or a predetermined symbol region as shown in FIGS. 22A and 22B.

FIGS. 22A and 22B illustrate an NR-DRS transmission method according to a further embodiment of the present invention.

As shown in FIGS. 22A and 22B, an NR-DRS may be transmitted over more than 14 symbols. In this case, the NR-DRS may be transmitted from a symbol where LBT is successful in the beam directions of beams #0 to #13 as shown in FIG. 22A. Alternatively, the NR-DRS may be transmitted from the index of a beam corresponding to a symbol where LBT is successful in a predetermined order of beam directions as shown in FIG. 22B.

(5) When the number of DRS SF candidates is 2 or more, a different NR-DRS transmission method may be applied according to the location of an SF where a gNB succeeds in LBT. For example, if the gNB succeeds in the LBT in the last SF among the DRS SF candidates, the gNB may perform the NR-DRS transmission using method (1) or (2). On the other hand, if the gNB succeeds in the LBT in an SF except the last SF among the DRS SF candidates, the gNB may the NR-DRS transmission using method (3) or (4).

If the gNB is configured to use method (1) for the NR-DRS transmission due to the LBT success in the last SF among the DRS SF candidates but fails in the LBT at the start boundary of the last SF, the gNB may no longer perform the LBT for the NR-DRS transmission in a corresponding period.

In the above-described first and second NR-DRS transmission methods, a UE may require information indicating the symbol of the DRS SF where the gNB actually starts the NR-DRS transmission. For example, the UE may require the above information to search for the best beam or perform the RRM measurement.

Next, the gNB may transmit information indicating the NR-DRS start symbol of the recent DRS SF in a certain SF except the DRS SF on a licensed or unlicensed carrier (via L1 signaling or higher layer signaling).

On the contrary, the UE may report information on the symbol/SF where the UE performs measurement (e.g., cell detection, RRM measurement, best beam information, etc.) based on the transmitted NR-DRS separately from/together with measurement results.

4.3. Random Access Preamble Transmission Method

In section 4.2, the NR-DRS transmission method depending on the time at which a gNB succeeds in LBT when transmitting an NR-DRS by forming analog beams has been described. To this end, the gNB may configure an SF(s) where a random access preamble will be transmitted with a predetermined periodicity. In addition, the gNB may form analog beams as a receiving end and attempt to receive random access preambles transmitted from UEs existing in cell coverage by performing reception beam sweeping over multiple time units in an omnidirectional manner.

If the gNB is able to form an analog beam in a different direction per symbol, a UE may basically transmit, to the gNB, a random access preamble composed of 1 symbol. When transmitting the random access preamble, the UE may not know when a gNB's reception beam is optimized to receive the random access preamble. Therefore, the UE may transmit even the random access preamble composed of 1 symbol over multiple symbols instead of transmitting the random access preamble in a single symbol.

In this case, the sequence of the preamble transmitted by the UE may be configured as follows:

(1) the sequence may be configured regardless of the index of a symbol/SF where the UE attempts the transmission; or (2) the sequence may be configured differently depending on the index of a symbol/SF where the UE attempts the transmission.

More generally speaking, when a UE transmits a preamble by forming one same beam, the UE may transmit the preamble across multiple symbols. For example, one same sequence may be repeated and transmitted in multiple symbols. Further, for the transmission, a different SF and different numerology may be applied (for example, it is possible to increase a symbol length by applying small subcarrier spacing).

4.3.1. First Random Access Preamble Transmission Method

When one preamble transmission SF is configured with a predetermined periodicity, a UE may be configured to transmit a preamble if succeeding in LBT before the boundary of the corresponding SF (or the first symbol reserved for the preamble transmission). Otherwise, the UE may be configured to drop the preamble transmission in the corresponding SF.

Alternatively, even if the UE fails in the LBT before the boundary of the corresponding SF (or the first symbol reserved for the preamble transmission), the UE may continue to perform the LBT and then transmit the preamble starting from the first symbol where the UE succeeds in the LBTs. For example, when preamble transmission is reserved during four symbols from symbol #0, if a UE fails in LBT before start of symbols #0/1 but succeeds in the LBT immediately before symbol #2, the UE may perform the preamble transmission from symbol #2 to symbol #X. In this case, X may be set to 3 or 5.

In addition, when the sequence of a preamble is configured differently depending on the index of a symbol/SF where transmission is attempted, the preamble may be transmitted after puncturing a preamble(s) to be transmitted in symbols #0/1.

4.3.2. Second Random Access Preamble Transmission Method

When multiple preamble transmission SFs are configured with a predetermined periodicity, a UE may transmit a preamble from the time at which the UE succeeds in LBT to a next SF. For example, when preamble transmission is reserved from symbol #0 to symbol #14, if a UE fails in LBT before start of symbols #0/1 but succeeds in the LBT immediately before symbol #2, the UE may perform the preamble transmission from symbol #2 to symbol #2 of a next SF.

In addition, when the sequence of a preamble is configured differently depending on the index of a symbol/SF where transmission is attempted, the preamble may be transmitted after puncturing a preamble(s) to be transmitted in symbols #0/1.

Additionally, although the multiple preamble transmission SFs are configured with the predetermined periodicity, the first random access preamble transmission method may be applied to each of the SFs. Alternatively, the first random access preamble transmission method may be applied only when a UE succeeds in the LBT in the last SF among the multiple SFs.

4.3.3. Third Random Access Preamble Transmission Method

Since an NR-DRS is transmitted in DL, it could be interpreted to mean that transmission is performed by the same node. However, since a random access preamble is transmitted in UL, transmission may be attempted by different UEs. For example, if UE1 and UE2 perform LBT to transmit preambles in one same SF, UE1 may start the transmission first due to different channel states, and UE2 may determine that the channel is busy and thus may not attempt the preamble transmission. Therefore, methods for supporting preamble transmission multiplexing between multiple UEs will be described in detail in this section.

4.3.3.1. First Multiplexing Method

A certain period (e.g., before start of a preamble transmission SF configured with a predetermined periodicity) is set as a common sensing period. Thereafter, only if a UE succeeds in LBT in the corresponding period, the UE can perform preamble transmission in any symbol of the preamble transmission SF (without additional LBT).

4.3.3.2. Second Multiplexing Method

A time period may be configured between preamble transmission SFs for the purpose of sensing.

Figure 23:
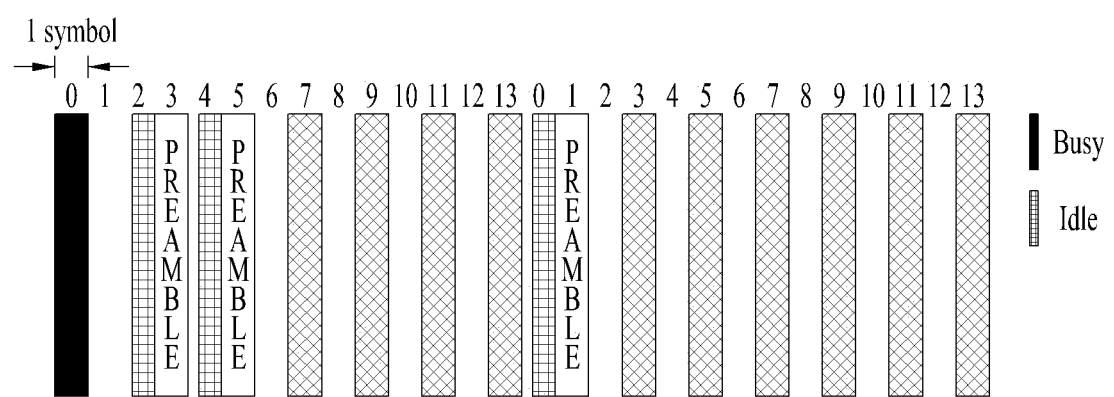
FIG. 23 illustrates a random access preamble transmission method according to an embodiment of the present invention.

FIG. 23 illustrates a random access preamble transmission method according to an embodiment of the present invention.

As shown in FIG. 23, preamble transmission may be allowed only in even symbols, and LBT may be performed in odd symbols. Alternatively, frequency resources may be allocated to the odd symbols for the purpose of sensing. In this case, the corresponding frequency resources should not be used as resources for the preamble transmission, and a UE should be able to perform CCA based on the amount of energy detected in the corresponding frequency resources.

If a UE intending to transmit preambles in symbols #1/3/5 shown in FIG. 23 fails in the LBT in symbol #0 of the first SF but succeeds in the LBT in symbols #2/4, the UE may transmit preambles in symbols #3/5 of the first SF and attempt the LBT in symbol #1 of the next SF for the preamble transmission.

4.3.3.3. Third Multiplexing Method

Especially, in an unlicensed band, a preamble can be transmitted via FDM rather than TDM with the 1-symbol structure. In other words, a gNB may receive preambles in an omnidirectional manner without perform reception beamforming.

4.3.3.4. Fourth Multiplexing Method

If a gNB occupies a channel before a preamble transmission SF and informs a UE that intends to perform preamble transmission of the occupied channel, the UE may attempt the preamble transmission without performing LBT.

For example, assuming that the preamble transmission SF is SF #n+k (for example, k=4) and the gNB succeeds in the LBT before SF #n, the gNB may inform the UE of the LBT success via L1 signaling in SF #n. Upon receiving the L1 signaling, the UE may attempt the preamble transmission without performing the LBT in SF #n+k (e.g., k=4). In this case, it may be desirable that the gNB configures the preamble transmission SF aperiodically based on the time when the gNB actually succeeds in the LBT instead of configuring the preamble transmission SF with a predetermined periodicity.

In all of the above-described random access preamble transmission methods, an SF in which a random access preamble is transmitted (hereinafter it is referred to as an RACH SF) may be related to a location of an NR-DRS SF.

For example, an SF located after k SFs from the first (or last) SF among NR-DRS SF candidates may be set to the first (or last) SF among RACH SF candidates.

In addition, the index of a symbol/SF/beam for a preamble to be transmitted in an RACH SF may be determined by a function of the index of a symbol/SF/beam for a signal transmitted in an NR-DRS SF. If an SF/symbol where NR-DRS transmission starts varies according to gNB's LBT results, the location of an SF/symbol where an RACH SF starts and the index of a symbol/SF/beam for a preamble to be transmitted in the RACH SF may also vary according to the SF/symbol where the NR-DRS transmission starts.

On the contrary, the location of an NR-DRS SF and a signal transmitted therein may be determined based on an RACH SF. For example, an SF appearing immediately after end of a DRS occasion in an NR-DRS SF may be set to an RACH SF.

In summary, the present invention discloses various configurations including the following signal transmission method.

First, the present invention discloses a method of transmitting a signal to a second communication node by a first communication node in a wireless communication system supporting an unlicensed band.

The first communication node may perform a channel access procedure for signal transmission in the unlicensed band. Here, the channel access procedure may include Listen Before Talk (LBT) for checking whether another signal is transmitted in the unlicensed band through channel sensing on the unlicensed band.

Thereafter, the first communication node may transmit the signal to the second communication node in the unlicensed band by applying independent analog beams to individual symbols during a predetermined number of symbol periods from a symbol in which the channel access procedure succeeds.

In this case, the analog beams applied to the individual symbols during the predetermined number of symbol periods from the symbol where the channel access procedure succeeds may be analog beams determined sequentially from the first analog beam index in analog beam index order, which is decided in advance to be applied when the first communication node transmits the signal.

Alternatively, the analog beams applied to the individual symbols during the predetermined number of symbol periods from the symbol where the channel access procedure succeeds may be analog beams determined sequentially and rotationally from an analog beam index corresponding to the symbol where the channel access procedure succeeds in analog beam index order, which is decided in advance to be applied when the first communication node transmits the signal.

Here, the predetermined number of symbol periods may be equal to or smaller than a symbol region required for the signal transmission.

For example, if the symbol region required for the signal transmission is greater than symbol length from the symbol where the channel access procedure succeeds until a time period allocated to the first communication node for the signal transmission, the predetermined number of symbol periods may be set to be equal to the symbol length from the symbol where the channel access procedure succeeds until the time period allocated to the first communication node for the signal transmission.

As another example, if the symbol region required for the signal transmission is smaller than the symbol length from the symbol where the channel access procedure succeeds until the time period allocated to the first communication node for the signal transmission, the predetermined number of symbol periods may be set to be equal to a symbol length of the symbol region required for the signal transmission.

In the present invention, the first communication node may be a New RAT (NR) base station or a terminal. In addition, the second communication node may be a terminal or an NR base station.

In the present invention, the signal transmitted by the first communication node may include a synchronization signal and either a signal used for Radio Resource Management (RRM) measurement or a random access preamble.

In particular, when the signal includes the synchronization signal and the signal used for the RRM measurement, the first communication node may transmit information on the symbol where the channel access procedure succeeds to the second communication node.

Since each of the examples of the proposed methods can be considered as one method for implementing the present invention, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from a base station to a terminal through a predefined signal (e.g., physical layer signal, higher layer signal, etc.).

5. Device Configuration

Figure 24:
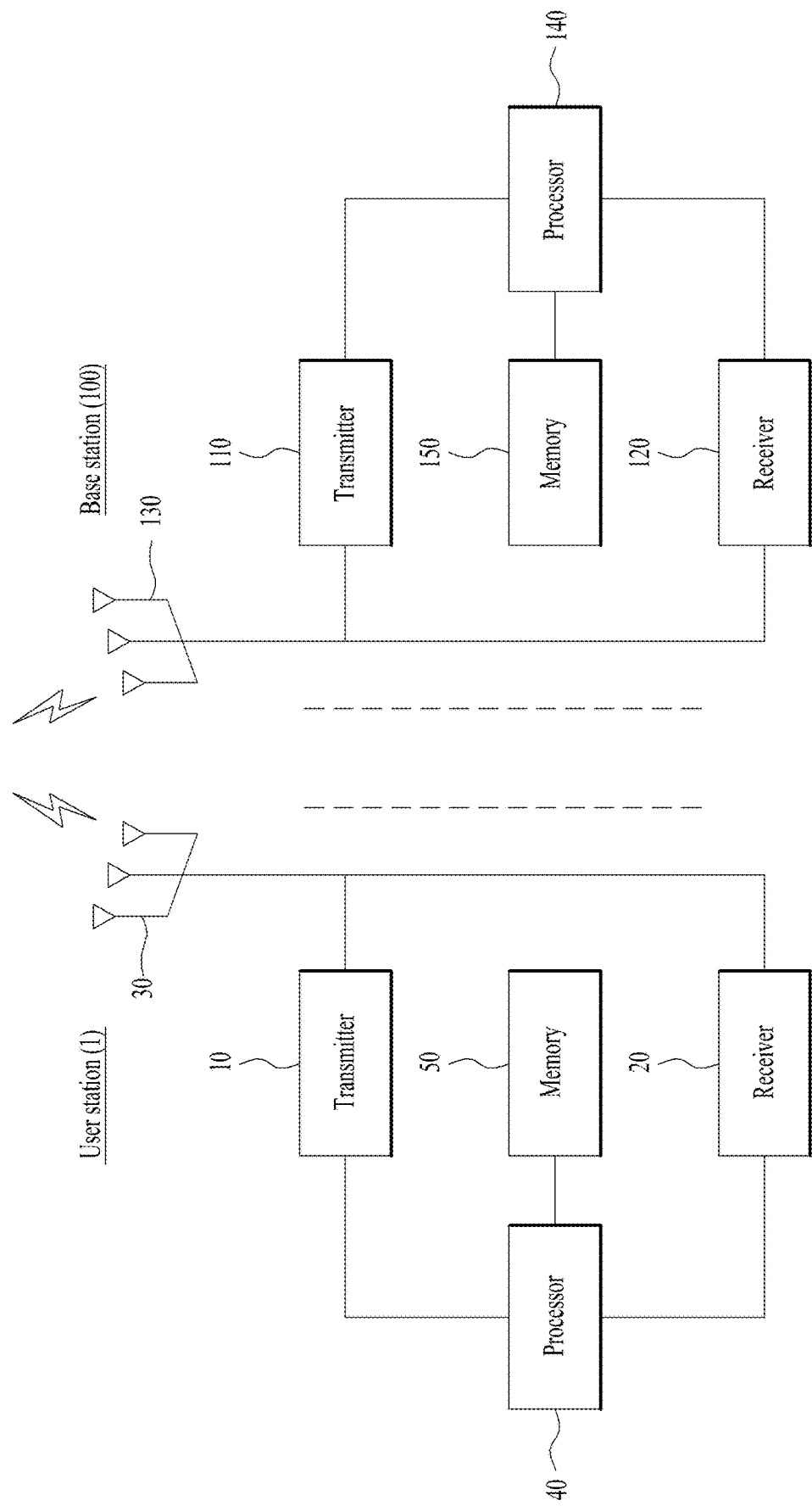
FIG. 24 illustrates configurations of a user equipment and a base station for implementing the proposed embodiments

FIG. 24 is a diagram illustrating configurations of a UE and a base station capable of being implemented by the embodiments proposed in the present invention. The UE and the base station shown in FIG. 24 operate to implement the embodiments of the method for transmitting and receiving signals.

A UE 1 may act as a transmission end on a UL and as a reception end on a DL. A base station (eNB or new generation NodeB (gNB)) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

In the present invention, each of the NR base station 100 and UE 1 may be operate as a first or second communication node. For example, when the NR base station 100 operates as the first communication node, the UE 1 may operate as the second communication node. On the contrary, when the UE 1 operates as the first communication node, the NR base station 100 may operate as the second communication node.

In this case, the first communication node may perform a channel access procedure for signal transmission in an unlicensed band using the processor and transmit a signal to the second communication node in the unlicensed band through the transmitter by applying an independent analog beam per symbol from a symbol where the channel access procedure succeeds during a predetermined number of symbol periods.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 24 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting a uplink signal by a user equipment (UE) in a wireless communication system supporting an unlicensed band, the method comprising:
   receiving, from a base station (BS), a downlink control information (DCI) including resource allocation information for an interlaced resource block (RB) based Physical Uplink Shared Channel (PUSCH) transmission,
   wherein the resource allocation information includes information about interlaces and one or more RB sets, which are configured within a bandwidth for a carrier, used for the PUSCH transmission; and transmitting, to the BS, a PUSCH based on a combination of the information about the interlaces and the one or more RB sets included in the DCI, wherein resources for the PUSCH transmission on frequency domain are determined based on an intersection of the interlaces and the one or more RB sets indicated by the resource allocation information.

2. The method of claim 1,
wherein each of the interlaces includes 10 RBs equally distributed at intervals of 10 RBs within the bandwidth.

3. The method of claim 1,
wherein resources for the PUSCH transmission on frequency domain are allocated in units of interlaces.

4. The method of claim 1,
wherein the bandwidth is divided into a plurality of bands and a channel access procedure is performed for each of the one or more RB sets independently, and
wherein each of the one or more RB sets used for the PUSCH transmission is a band that the channel access procedure performed by the BS is successful.

5. The method of claim 1, further comprising:
receiving, from the BS, information for configuring the interlaced RBs based PUSCH transmission.

6. A user equipment (UE) for transmitting an uplink signal in a wireless communication system supporting an unlicensed band, the UE comprising:
at least one processor; and
at least one computer memory operatively coupled to the at least one processor and configured to cause, when executed, the at least one processor to perform an operation, the operation comprising:
receiving, from a base station (BS), a downlink control information (DCI) including resource allocation information for an interlaced resource block (RB) based Physical Uplink Shared Channel (PUSCH) transmission,
wherein the resource allocation information includes information about interlaces and one or more RB sets, which are configured within a bandwidth for a carrier, used for the PUSCH transmission; and
transmitting, to the BS, a PUSCH based on a combination of the information about the interlaces and the one or more RB sets included in the DCI,
wherein resources for the PUSCH transmission on frequency domain are determined based on an intersection of the interlaces and the one or more RB sets indicated by the resource allocation information.

7. The UE of claim 6,
wherein each of the interlaces includes 10 RBs equally distributed at intervals of 10 RBs within the bandwidth.

8. The UE of claim 6,
wherein resources for the PUSCH transmission in frequency domain are allocated in units of interlaces.

9. The UE of claim 6,
wherein the bandwidth is divided into a plurality of bands and a channel access procedure is performed for each of the one or more RB sets independently, and
wherein each of the one or more RB sets used for the PUSCH transmission is a band that the channel access procedure performed by the BS is successful.

10. The UE of claim 6,
wherein the operation further comprises receiving, from the BS, information for configuring the interlaced RB based PUSCH transmission.

11. A method of receiving an uplink signal by a base station (BS) in a wireless communication system supporting an unlicensed band, the method comprising:
transmitting, to a user equipment (UE), a downlink control information (DCI) including resource allocation information for an interlaced resource block (RB) based Physical Uplink Shared Channel (PUSCH) transmission of the UE,
wherein the resource allocation information includes information about interlaces and one or more RB sets which are configured within a bandwidth for a carrier, used for the PUSCH transmission of the UE, and
receiving, from the UE, the PUSCH based on a combination of the information about the interlaces and the one or more RB sets included in the DCI,
wherein resources for the PUSCH transmission on frequency domain are determined based on an intersection of the interlaces and the one or more RB sets indicated by the resource allocation information.

12. A base station (BS) for receiving an uplink signal in a wireless communication system supporting an unlicensed band, the BS comprising:
at least one processor; and
at least one computer memory operatively coupled to the at least one processor and configured to cause, when executed, the at least one processor to perform an operation, the operation comprising:
transmitting, to a user equipment (UE), a downlink control information (DCI) including resource allocation information for an interlaced resource block (RB) based Physical Uplink Shared Channel (PUSCH) transmission of the UE,
wherein the resource allocation information includes information about interlaces and one or more RB sets which are configured within a bandwidth for a carrier, used for the PUSCH transmission of the UE, and
receiving, from the UE, the PUSCH based on a combination of the information about the interlaces and the one or more RB sets included in the DCI,
wherein resources for the PUSCH transmission on frequency domain are determined based on an intersection of the interlaces and the one or more RB sets indicated by the resource allocation information.

* * * * *